United States Patent
Takagi

(10) Patent No.: US 8,127,817 B2
(45) Date of Patent: Mar. 6, 2012

(54) RUBBER SHEET JOINTING APPARATUS AND METHOD

(75) Inventor: Shigemasa Takagi, Hashima (JP)

(73) Assignees: Fuji Shoji Co., Ltd., Hashima-shi (JP); Fuji Seiko Co., Ltd., Hashima-shi (JP)

( * ) Notice: Subject to any disclaimer, the term of this patent is extended or adjusted under 35 U.S.C. 154(b) by 1092 days.

(21) Appl. No.: 11/443,183

(22) Filed: May 31, 2006

(65) Prior Publication Data

US 2006/0272780 A1 Dec. 7, 2006

(30) Foreign Application Priority Data

Jun. 6, 2005 (JP) .................................. 2005-165041
Aug. 4, 2005 (JP) .................................. 2005-226908

(51) Int. Cl.
*B29D 30/42* (2006.01)

(52) U.S. Cl. ..................... 156/502; 156/157; 156/304.1; 156/304.5; 156/397; 156/421.6; 156/507; 156/516; 156/519; 156/556; 156/558

(58) Field of Classification Search .................. 156/507, 156/157, 304.1, 304.5, 397, 421.6, 502, 516, 156/519, 556, 558

See application file for complete search history.

(56) References Cited

U.S. PATENT DOCUMENTS

| | | |
|---|---|---|
| 3,100,731 A | 8/1963 | Brey et al. |
| 3,962,022 A | 6/1976 | Bottasso et al. |
| 4,054,475 A | 10/1977 | Bottasso et al. |
| 4,765,862 A * | 8/1988 | Azuma .......................... 156/507 |
| 5,348,600 A | 9/1994 | Ishii |
| 7,073,552 B2 | 7/2006 | Dyrlund et al. |
| 2006/0219358 A1 | 10/2006 | Dyrlund et al. |

FOREIGN PATENT DOCUMENTS

| | | |
|---|---|---|
| EP | 0 417 991 A2 | 3/1991 |
| EP | 0 431 854 A2 | 6/1991 |
| EP | 1 358 999 A1 | 11/2003 |
| EP | 1 431 023 A2 | 6/2004 |
| EP | 1 658 952 A1 | 5/2006 |
| GB | 1 376 400 | 12/1974 |
| JP | 36-14941 | 9/1961 |

(Continued)

OTHER PUBLICATIONS

U.S. Appl. No. 11/868,713, filed Oct. 8, 2007, Takagi.

*Primary Examiner* — Mark A Osele
*Assistant Examiner* — Nickolas Harm
(74) *Attorney, Agent, or Firm* — Oblon, Spivak, McClelland, Maier & Neustadt, L.L.P.

(57) ABSTRACT

A rubber sheet jointing apparatus is provided with a first holding member for releasably holding a joint end portion of one of two rubber sheets; a second holding member provided movably relative to the first holding member for releasably holding a joint end portion of the other of the two rubber sheets; and an operating member for pressure-contacting the end surfaces of the two rubber sheets respectively held by the first and second holding member by moving the second holding member relative to the first holding member. Mutually facing surfaces of the first and second holding member are respectively provided with holder portions which are formed as rugged portions each taking a comb tooth shape and which are able to partly overlap to mesh with each other.

6 Claims, 23 Drawing Sheets

FOREIGN PATENT DOCUMENTS

| | | |
|---|---|---|
| JP | 37-8471 | 7/1962 |
| JP | 50-43183 | 4/1975 |
| JP | 52-135470 | 4/1976 |
| JP | 60-105130 | 7/1985 |
| JP | 61-143143 | 6/1986 |
| JP | 62-187020 | 8/1987 |
| JP | 03-190725 | 8/1991 |
| JP | 4-104433 | 9/1992 |
| JP | 5-26350 | 4/1993 |
| JP | 07-276505 | 10/1995 |
| JP | 2001-138404 | 5/2001 |
| JP | 2002-11805 | 1/2002 |
| JP | 2003-071951 | 3/2003 |
| JP | 2004-142219 | 5/2004 |
| JP | 2004-203041 | 7/2004 |
| JP | 2006-142828 | 6/2006 |

\* cited by examiner

US 8,127,817 B2

RUBBER SHEET JOINTING APPARATUS AND METHOD

INCORPORATION BY REFERENCE

This application is based on and claims priority under 35 U.S.C. 119 with respect to Japanese Applications No. 2005-165041 filed on Jun. 6, 2005 and No. 2005-226908 filed on Aug. 4, 2005, the entire contents of which are incorporated herein by reference.

BACKGROUND OF THE INVENTION

1. Field of the Invention

The present invention relates to a rubber sheet joining apparatus and method for joining the end surfaces of one or two rubber sheets with each other by butt joint. In particular, it relates to a rubber sheet joining apparatus and method capable of manufacturing a jointed plane rubber sheet or a round or endless rubber band easily and efficiently without making any bulge at the jointed portion thereof.

2. Discussion of the Related Art

Generally, for vehicular tires, inner liners which are composite rubber sheets made from rubber only and body or carcass plies, belts and the like which are rubber sheets reinforced by fibers or steel cords are often used by jointing end surfaces of rubber sheet strips. For example, the rubber sheet for a body ply, a belt or the like having a predetermined length can be manufactured by making by a calendar rolling machine a roll of a long rubber textile or cloth having numerous cords embedded in the rubber layer, then by uncoiling and cutting the roll of the long rubber cloth which has the cords arranged parallel in the longitudinal direction thereof, to those sheet strips of the length corresponding to the width of the body ply or the belt which width depends on the kind and dimension of the tire to be manufactured, and further, by mutually jointing the end edges parallel to the cords of those rubber sheet stripes so cut.

Used generally for jointing end edges of two adjoining sheets are two methods called "lap joint" and "butt joint". The lap joint can be performed by lapping an end edge of a second sheet on an end edge of a first sheet and then, by applying a pressure on a jointed area including the lapped area.

In the lap joint method, since the thickness of the rubber sheet at the lapped joint area becomes as twice the thickness of other areas, doubled are not only the thickness of the rubber sheet, but also the number of the reinforcing cords in the case of a fiber or steel cord reinforced rubber sheet. Thus, the thickness of the jointed rubber sheet dose not become uniform and the difference in rigidity becomes large, so that the uniformity of the tire is degraded. For this reason, the use of the lap joint method tends to decrease these days.

On the other hand, the butt joint can be performed by thrusting the end edge of one sheet against the end edge of the other sheet and then, by pressuring them to be firmly jointed by mechanical or physical means. Thus, a bulge is generated at the jointed portion.

That is, as described in Japanese Unexamined Published Patent Application No. 2004-142219, since the both end edges of first and second sheets are jointed as being drawn to come closer to each other by a pair of rollers each taking a bevel wheel shape, the bulge is generated on the jointed portion.

In order to level out the bulge on the jointed portion, the technology described in the foregoing Japanese application is designed to heighten the flatness at the jointed portion by adding as a step subsequent to the sheet jointing a leveling or smoothening step of pressing down the jointed portion by upper and lower leveling plates including warming means with the jointed portion being put therebetween from upper and lower sides.

However, in the technology described in the foregoing Japanese application, the flatness on the jointed portion is obtained by chemically changing the quality of the rubber by the use of the upper and lower leveling plates including the warming means. Thus, the jointed portion and other portions of the sheet become the same in thickness, but different in quality. Therefore, where tires are manufactured using sheets each jointed by the foregoing jointing method, it results that a portion which is not uniform in physical property with other portions is present on the circumference of the tire, and this causes an obstruction in enhancing the tire quality. In addition, the addition of the smoothening step causes not only an increase in the cost of the manufacturing facilities, but also an elongation in the manufacturing cycle time.

Further, as described in Japanese Unexamined Published Patent Application No. 2002-11805, there has also been known a jointing apparatus and method for butt-jointing the circumferential opposite end portions of an unvulcanized rubber sheet blank such as carcass or body ply used as tire component blank or the like on a shaping drum. In the apparatus and method described in the Japanese application, a belt-like rubber blank cut to a predetermined length is wound on the circumferential surface of the shaping drum to cling thereto with jointing portions of the shaping drum held opened, and joint end portions of the belt-like rubber blank are drawn toward each other to be temporarily jointed by closing or diametrically contracting the shaping drum, in which state the joint end portions are pressure-jointed by a pair of rollers each taking a bevel wheel shape.

In the last mentioned apparatus and method, since the joint end portions of the belt-like shape rubber blank are jointed as they are made by the rollers of the bevel wheel shape to come close to each other, it necessarily results that the jointed portion has a bulge thereon and is degraded in flatness. Accordingly, in order to level out the bulge on the jointed portion, it becomes necessary to heighten the flatness at the jointed portion by adding as a step subsequent to the sheet jointing a smoothening step of pressing down the jointed portion by leveling plates including warming means with the jointed portion being put therebetween from upper and lower sides, as described in the first mentioned Japanese application.

As described above, in the last mentioned apparatus and method, in order to level out the bulge on the jointed portion, it is required to improve the flatness by chemically degenerating the rubber by the use of the leveling plates including warming means, as described in the first mentioned Japanese application. Accordingly, where tires are manufactured using carcass or body plies each jointed by the last mentioned jointing apparatus and method, each tire would have at the circumferential portion thereof a portion which lacks uniformity because of being different in physical property, thereby making an obstruction in improving the tire quality. In addition, the addition of the smoothening step undesirably causes not only an increase in the cost for tire manufacturing facilities but also an elongation in the manufacturing cycle time.

SUMMARY OF THE INVENTION

It is therefore a primary object of the present invention to provide an improved jointing apparatus and method for jointing end surfaces of two joint end portions of at least one rubber sheet to have a jointed portion which does not have any bulge thereon and which is uniform in thickness as well as in quality.

Another object of the present invention is to provide an improved jointing apparatus and method of the character set forth above which is particularly designed for manufacturing plane rubber sheet blanks.

A further object of the present invention is to provide an improved jointing apparatus and method of the character set forth above which is particularly designed for manufacturing round or endless rubber sheet blanks.

A still further object of the present invention is to provide an improved jointing apparatus and method of the character set forth above which is particularly designed for continuously performing the jointing of a plurality of rubber sheet strips to manufacture an elongated rubber sheet batch and the jointing of opposite end portions of the elongated rubber sheet batch to manufacture a round or endless rubber band within a single rubber sheet joining apparatus.

According to one aspect of the present invention, there is provided a rubber sheet jointing apparatus for jointing end surfaces of two joint end portions of at least one rubber sheet by butt joint. The apparatus comprises first holding means for releasably holding one of the two joint end portions; second holding means provided movably relative to the first holding means for releasably holding the other of the two joint end portions; and operating means for pressure-contacting end surfaces of the two joint end portions respectively held by the first and second holding means by effecting relative movement between the first and second holding means. Mutually facing surfaces of the first and second holding means are respectively provided with holder portions which are able to overlap to mesh with each other.

With this construction, since the holder portions which are able to overlap to mesh with each other are provided on the mutually facing surfaces of the first and second holding means for respectively holding the two joint end portions to be jointed with each other, the jointing of the joint end surfaces with each other can be realized with the entire parts of the two joint end portions being held steadily. Thus, even when the two joint end portions of the at least one rubber sheet are pressure-joined with a strong pressuring force, any bulge can be prevented from occurring on the jointed portion. Therefore, it can be realized to easily manufacture a plane rubber sheet blank or a round rubber sheet blank which is uniform in thickness and excellent in flatness at the jointed portion. In addition, because no heat is applied to the rubber sheet, the same does not deteriorate in quality, so that it can be realized to easily obtain the plane rubber sheet blank or a round rubber sheet which is uniform also in quality at the jointed portion.

According to another or second aspect of the present invention, there is provided a rubber sheet jointing method of jointing end surfaces of two joint end portions of at least one rubber sheet by butt joint. The method comprises the steps of providing first and second holding means which are able to overlap to mesh with each other at mutually facing surfaces thereof; making one of the first and second holding means hold one of the two joint end portions and making the other of the first and second holding means hold the other of the two joint end portions; and relatively moving the first and second holding means to a position where the first holding means partly overlap with the second holding means through the meshing engagement at the mutually facing surfaces of the first and second holding means, to joint through pressuring contact the end surface of one of the two joint end portions being held by the first holding means with the other joint end portion being held by the second holding means.

With the construction in the second aspect, the first holding means for holding one of the two joint end portions and the second holding means for holding the other of the two joint end portions are relatively moved to the position where they overlap with each other, to joint the two joint end portions of at least one rubber sheet. Thus, even when the two joint end portions are pressure-joined with a strong pressuring force, any bulge can be prevented from occurring on the jointed portion. This makes it unnecessary to perform a leveling or smoothening step of rolling or leveling any bulge which would otherwise be formed on the jointed portion after the jointing step. Accordingly, it can be realized to efficiently manufacture a plane rubber sheet blank or a round or endless rubber sheet blank which is uniform in thickness and excellent in flatness at the jointed portion.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DESCRIPTION OF PREFERRED EMBODIMENTS OF THE INVENTION

First Embodiment

Hereinafter, with reference to the accompanying drawings, description will be made regarding a first embodiment wherein the present invention is practiced for manufacturing fiber-reinforced plane rubber sheet blanks for tire body plies. For convenience in description, a vertical direction, a left-right horizontal direction and a front-rear horizontal direction in FIG. 2 will be referred to as a Z-axis direction, a Y-axis direction and an X-axis direction respectively, and the left and right in FIG. 2 will be referred to as the front side and the rear side in the Y-axis direction, respectively.

Figure 1:
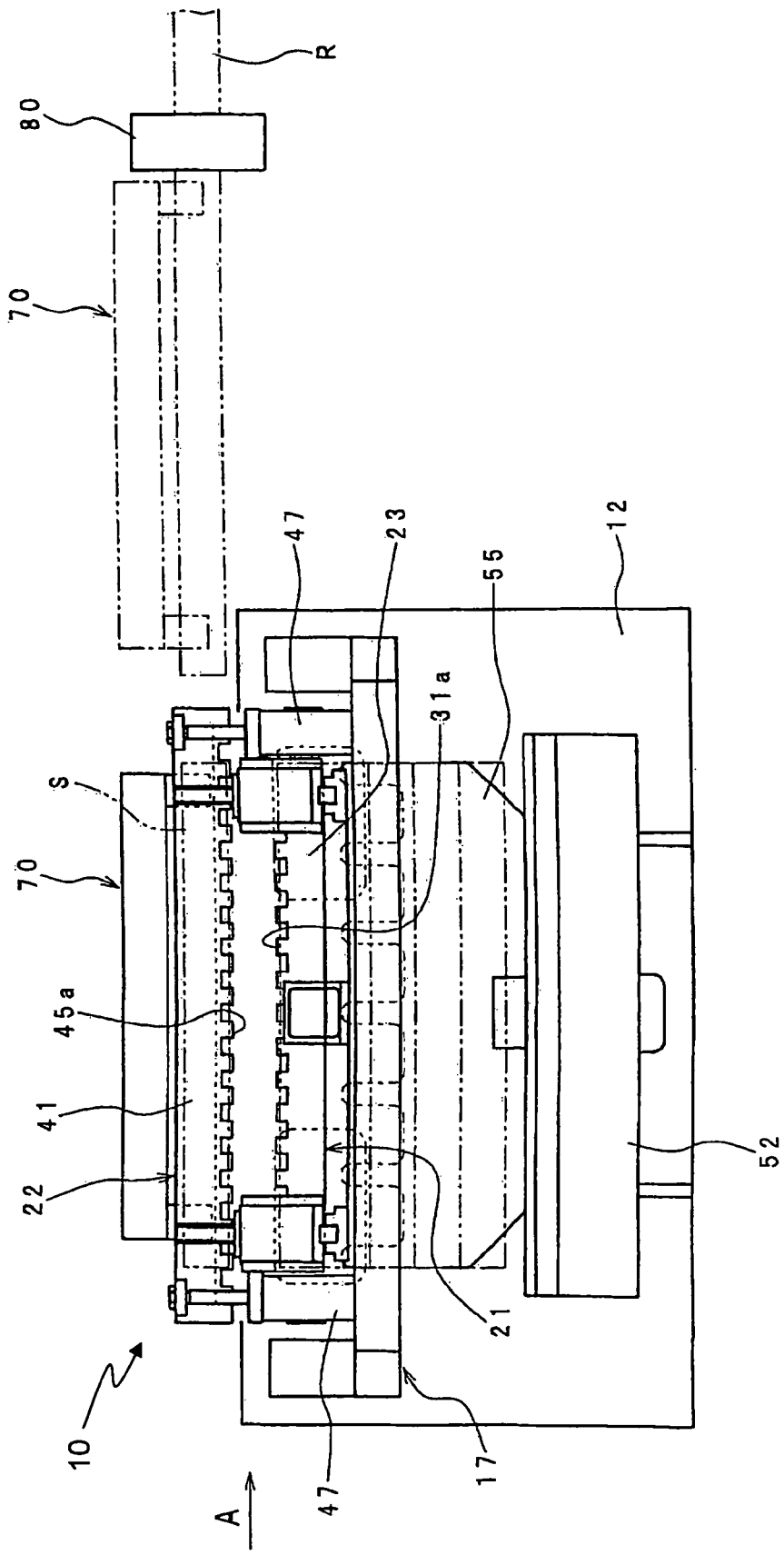
FIG. 1 is a plan view of a rubber sheet jointing apparatus in a first embodiment according to the present invention.
Figure 2:
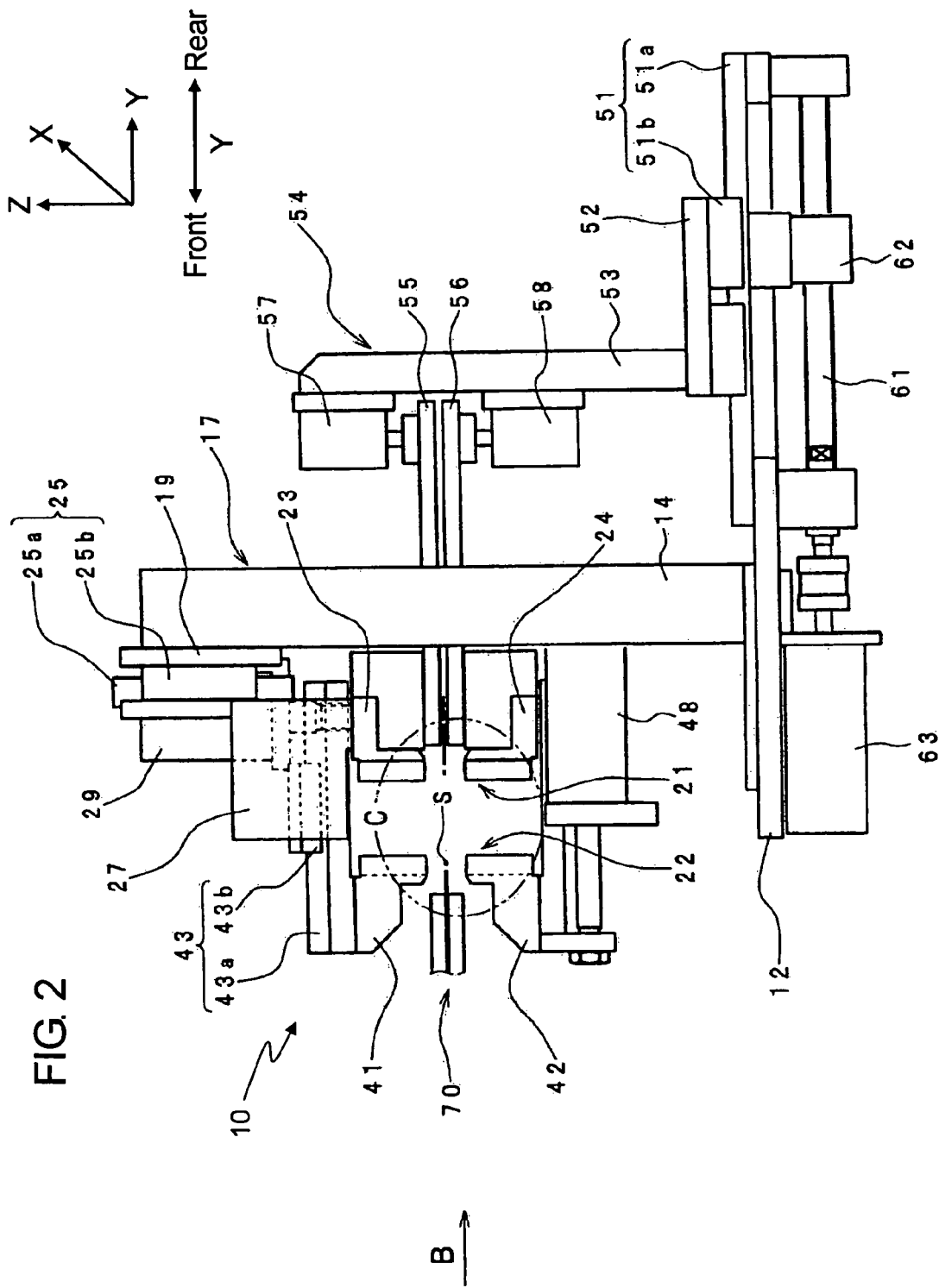
FIG. 2 is an enlarged side view of the apparatus as viewed in the direction A in FIG. 1.
Figure 3:
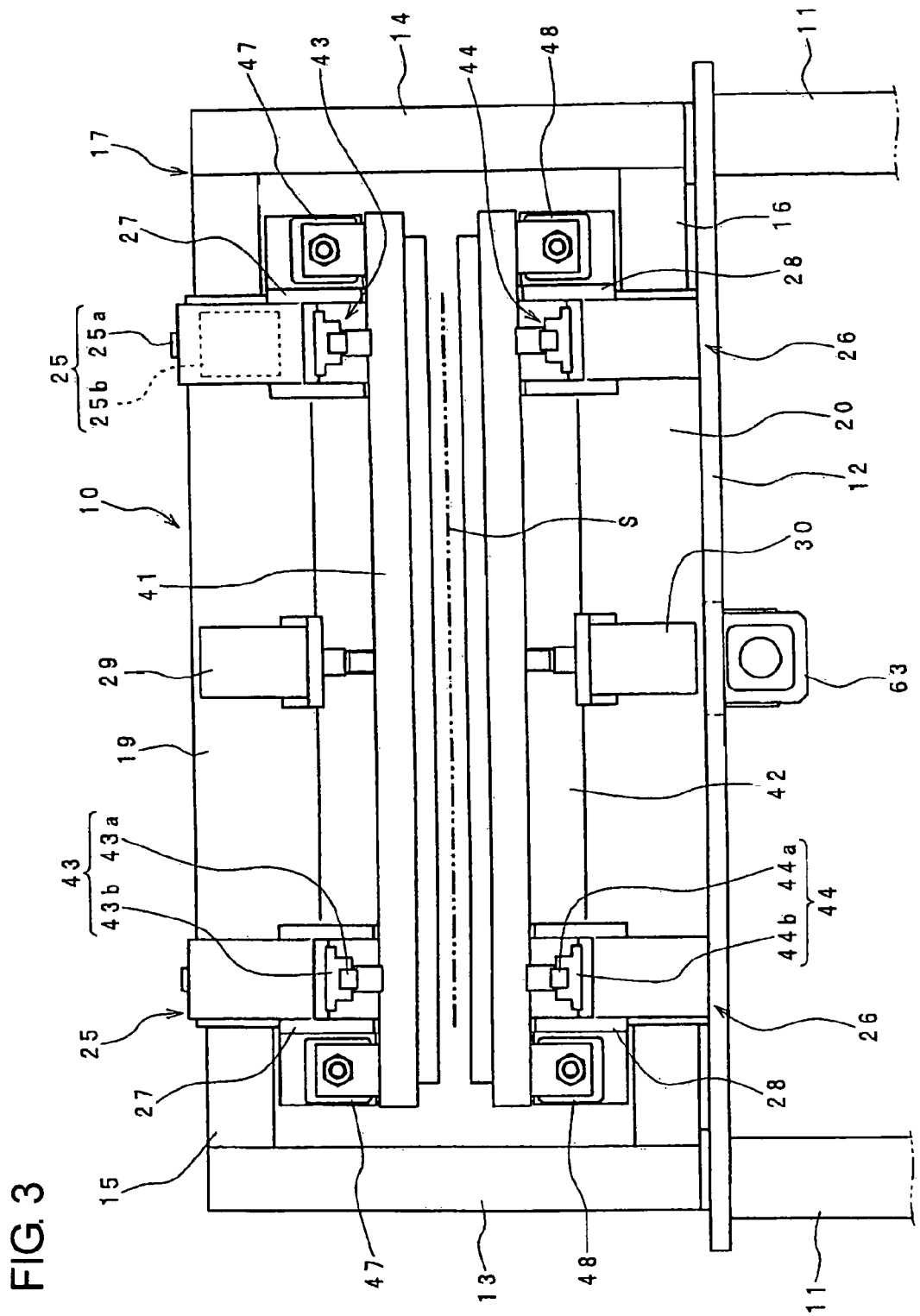
FIG. 3 is an enlarged elevational view of the apparatus as viewed in the direction B in FIG. 2.

Referring now to FIGS. 1 through 3, a rubber sheet jointing apparatus 10 for jointing the end surfaces of two rubber sheets S is arranged at a butt joint station 2st. The jointing apparatus 10 is provided with a support table 12, which is horizontally arranged on the factory floor through leg portions 11 thereof. The support table 12 has a pair of support pillars 13, 14 upstanding with a predetermined space therebetween. The upper ends and the lower ends of the pair of support pillars 13, 14 are connected with respective crossbeams 15, 16, whereby a fixed frame 17 is constituted by the support pillars 13, 14 and the crossbeams 15, 16.

Mounting bases 19, 20 each extending in the X-axis direction are fixed respectively on the crossbeams 15, 16 of the fixed frame 17, and the mounting bases 19, 20 are respectively provided with first holding means 21 for holding one of two rubber sheets S which are to be jointed with each other, and a second holding means 22 which is movable relative to the first holding means 21 in the horizontal Y-direction while holding the other of the two rubber sheets S.

The first holding means 21 is provided with a pair of first holders 23, 24 which are movable to and from each other in the vertical direction. The pair of first holders 23, 24 are vertically movably guided respectively along upper and lower linear guides 25, 26 arranged in the vertical direction and are vertically opened and closed by first cylinder actuators 29, 30 in a synchronous relation.

That is, guide blocks 25b for the upper linear guides 25 are arranged at the opposite ends in the X-axis direction of the upper mounting base 19, and the guide blocks 25b vertical slidably guide rails 25a respectively. The rails 25a attach thereto connection blocks 27, which are connected respectively to the opposite end portions of the first holder 23 on the upper side.

Similarly, guide blocks 26b for the lower linear guides 26 are arranged at the opposite ends in the X-axis direction of the lower mounting base 20, and the guide blocks 26b vertical slidably guide rails 26a respectively. The rails 26a attach thereto connection blocks 28, which are connected respectively to the opposite end portions of the first holder 24 on the lower side.

The first cylinder actuators 29, 30 are arranged respectively at center portions in the X-axis direction of the mounting bases 19, 20, and piston rods of the first cylinder actuators 29, 30 are connected respectively to the upper end of the first holder 23 on the upper side and the lower end of the first holder 24 on the lower side. Thus, the pair of first holders 23, 24 can be opened and closed vertically by the first cylinder actuators 29, 30.

Figure 4:
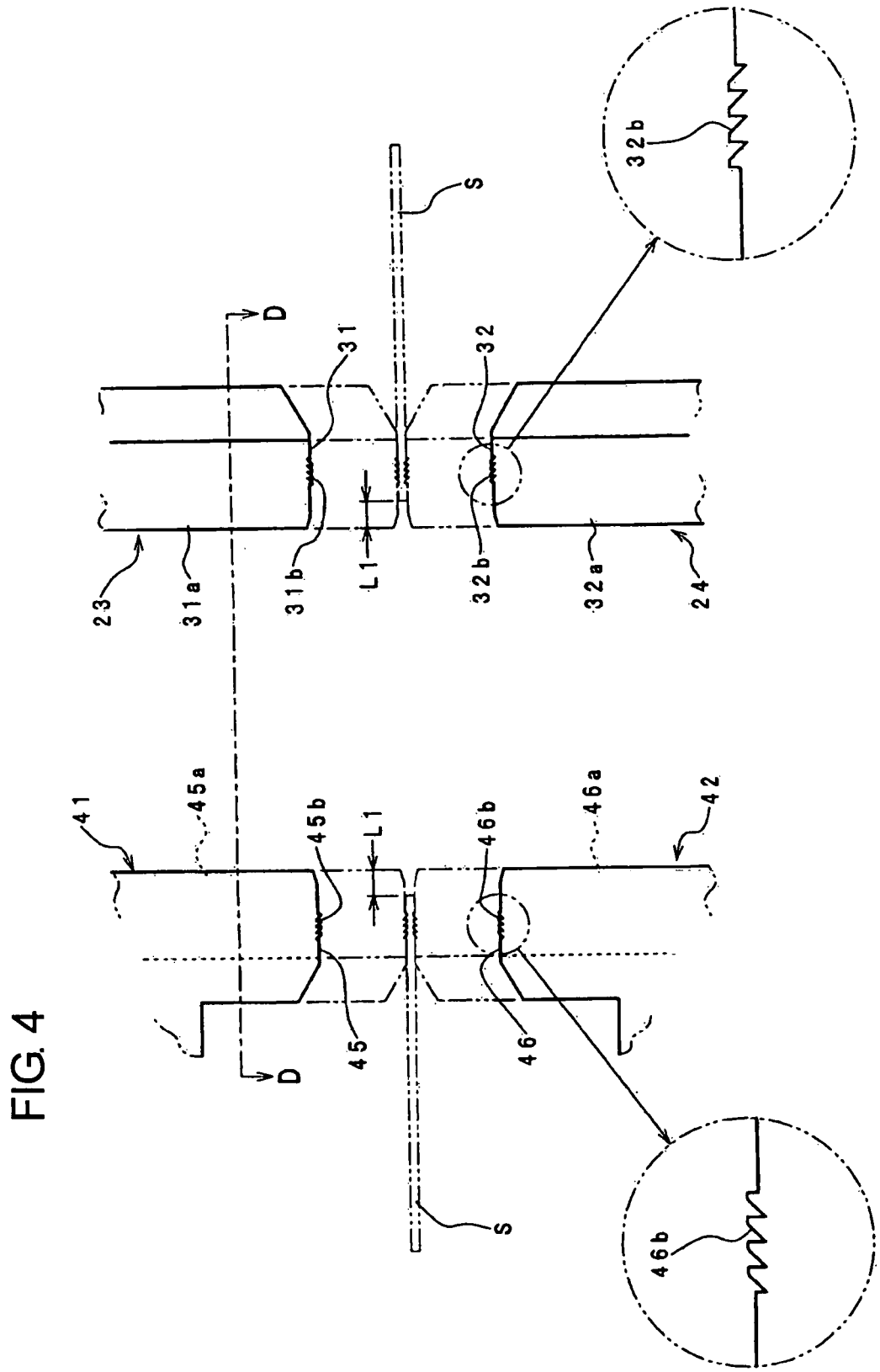
FIG. 4 is a fragmentary view showing a portion C shown in FIG. 2 in detail in an exaggerated scale.
Figure 5:
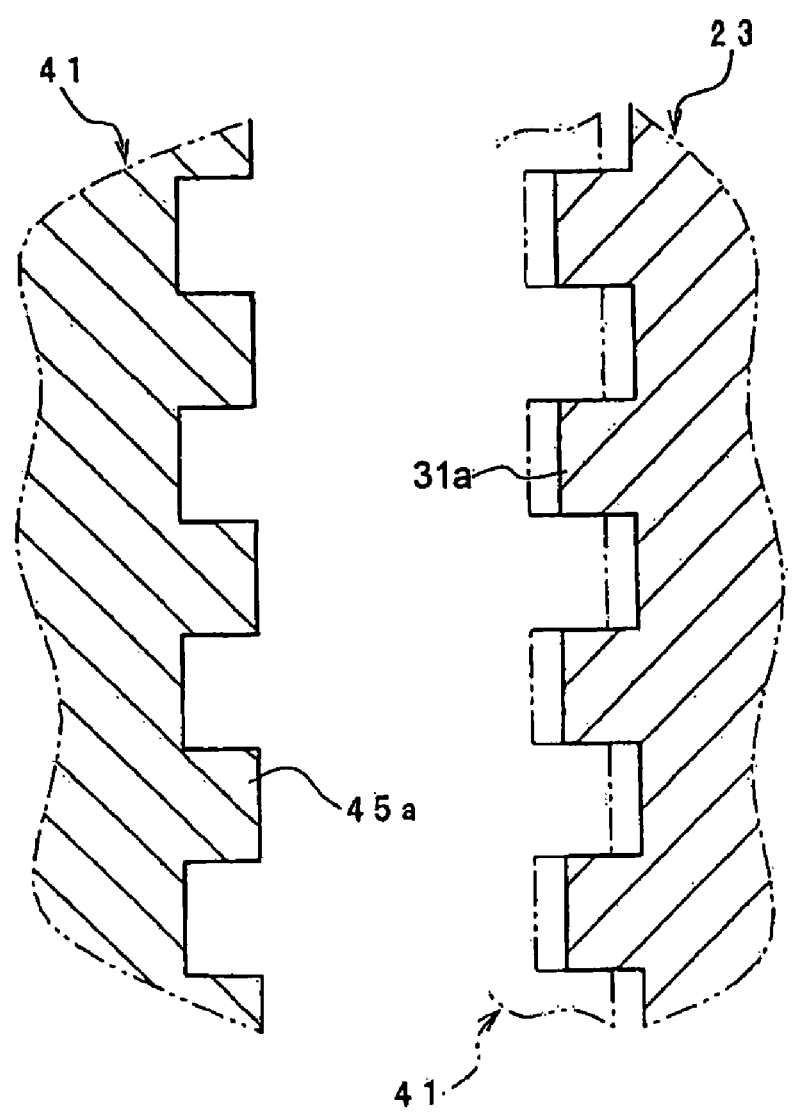
FIG. 5 is a fragmentary view taken along a line D-D in FIG. 4 for showing rugged portions which are able to mesh with each other, in a further exaggerated scale.

As shown in FIGS. 4 and 5 in detail, rugged portions 31a, 32a each taking a comb tooth shape of a predetermined depth are formed at respective end portions (the left end portions as viewed in FIG. 2) of holder portions 31, 32 which are defined as holder ends of the pair of first holders 23, 24, and are able to partly overlap with those of a pair of second holders, as referred to later. Mutually facing ends in the vertical direction of the holder portions 31, 32 cooperate to hold the joint end portion of the rubber sheet S at a position retracted by an amount L1 from the end surfaces of the rugged portions 31a, 32a. The predetermined depth of the rugged portions 31a, 32a is set to be deeper than the amount L1, as referred to later in detail. Further, as shown in FIG. 4, the mutually facing surfaces at which the holder portions 31, 32 are brought into contact with the rubber sheet S have formed thereon wave claws 31b, 32b such as, e.g., saw tooth claws of a minute height which bite the upper and lower surfaces of the rubber sheet S, so that the rubber sheet S does not retract relative to the holder portions 31, 32 during the jointing operation.

The horizontal lengths of the holder portions 31, 32 in the X-axis direction is designed to be longer than the length LB (refer to FIG. 10) of the rubber sheet S, and when the operations of the first cylinder actuators 29, 30 cause the first holders 23, 24 to come closer to each other, the holder portions 31, 32 can hold the rubber sheet S therebetween over the entire length of the rubber sheet S.

On the other hand, the second holding means 22 is provided with a pair of second holders 41, 42 which are vertically movable to and from each other. The pair of second holders 41, 42 are connected to the connection blocks 27, 28 through upper linear guides 43 and lower linear guides 44 which are arranged horizontally in the Y-axis direction. Therefore, the pair of second holders 41, 42 can be opened or closed bodily with the opening or closing motion of the pair of first holders 23, 24.

That is, the pair of second holders 41, 42 are provided on the rails 43a, 44a of the upper and lower linear guides 43, 44 to face the first holders 23, 24 in the Y-axis direction, respectively. The rails 43a, 44a are guided by the guide blocks 43b, 44b provided on the connection blocks 27, 28, to be slidable in the horizontal Y-axis direction.

The connection blocks 27, 28 are provided with second cylinder actuators 47, 48, whose piston rods are connected to the pair of second holders 41, 42. Therefore, the pair of second holders 41, 42 are bodily moved in the horizontal direction by the synchronous motions of the second cylinder actuators 47, 48, so that the second holders 41, 42 are moved relative to the first holders 23, 24 in the Y-axis direction. The second cylinder actuators 47, 48 constitute operating means in the claimed invention.

As shown in FIGS. 4 and 5 in detail, rugged portions 45a, 46a each taking a comb tooth shape of the aforementioned predetermined depth are formed at end portions (the right end portions as viewed in FIG. 2) of holder portions 45, 46 which are defined as holder ends of the pair of second holders 41, 42 respectively facing the first holders 23, 24. The rugged portions 45a, 46a are able to partly overlap with those of the pair of first holders 23, 24. Mutually facing ends in the vertical direction of the holder portions 45, 46 cooperate to hold the joint end portion of another rubber sheet S (which will be referred to as "second rubber sheet S" only for the sake of distinction from the rubber sheet S being held by the first holders 23, 24) to be jointed with the first mentioned rubber sheet S, at a position retracted by the aforementioned amount L1 from the end surfaces of the rugged portions 45a, 46a. The predetermined depth of the rugged portions 45a, 46a is set to be deeper than the amount L1. Further, as shown in FIG. 4, the mutually facing surfaces at which the holder portions 45, 46 are brought into contact with the second rubber sheet S have formed thereon wave claws 45b, 46b such as, e.g., saw tooth claws of the aforementioned minute height which bite the upper and lower surfaces of the second rubber sheet S, so that the second rubber sheet S does not retract relative to the holder portions 45, 46 during the jointing operation.

As best shown in FIG. 5, the rugged portions 45a, 46a formed on the side of the pair of second holders 41, 42 are arranged to face their concave portions with the convex portions of the rugged portions 31a, 32a formed on the side of the pair of first holders 23, 24, so that as mentioned earlier, the rugged portions 45a, 46a can complementarily be meshed respectively with the rugged portions 31a, 32a. Therefore, the first holders 23, 24 and the second holders 41, 42 partly overlap with each other through intermeshing of the comb-tooth shape rugged portions 31a, 32a with the comb-tooth shape rugged portions 45a, 46a. The horizontal length of the holder portions 45, 46 in the X-axis direction is also designed to be longer than the aforementioned length LB of the rubber sheet S, so that the holder portions 45, 46 can hold the second rubber sheet S therebetween over the entire length of the second rubber sheet S.

Rails 51a of parallel linear guides 51 (one only shown in FIG. 2) extending in the Y-axis direction are fixed on the support table 12 behind the fixed frame 17, and a movable table 52 is guided on the rails 51a through guide blocks 51b of the liner guides 51 to be movable in the Y-axis direction. The movable table 52 has a vertical frame 53 upright therefrom, on which feeding means 54 is provided for holding and feeding the rubber sheet S (i.e., one rubber sheet or a batch of two or more jointed rubber sheets) by a predetermined amount whenever operated.

The feeding means 54 is provided with a pair of third holders 55, 56 which are vertically movable to and from each other. The pair of third holders 55, 56 are respectively connected to third cylinder actuators 57, 58 mounted on the vertical frame 53 and are vertically opened and closed by the third cylinder actuators 57, 58. The pair of third holders 55, 56 pass through the fixed frame 17 and extend their ends (i.e., their front ends) to a position where the delivery of the rubber sheet S can be done between the first holders 23, 24 and themselves. The third cylinder actuators 57, 58 serve as second operation means recited in the claimed invention.

A ball screw shaft 61 is supported under the support table 12 to be rotatable about an axis parallel to the Y-axis direction and is screw-engaged with a ball nut 62 fixed on the lower surface of the movable table 52. The ball screw shaft 61 is connected to a motor shaft of an electric motor 63 mounted on the support table 12, so that upon operation of the electric motor 63, the movable table 52 is controllably moved through the ball screw shaft 61 and the ball nut 62 in the Y-axis direction.

Components which respectively movably guide and support the first holding means 21 and the second holding means 22 are arranged to be vertically symmetrical as viewed in FIG. 3. However, in order that the constructions of the first holding means 21 and the second holding means 22 become easier to understand, FIG. 2 is drawn by omitting at the upper half the cylinder actuator 47 for moving the second holder 41 arranged on the upper side and by omitting at the lower half the liner guide 26, the connection block 28, the first cylinder actuator 30 and the like which are provided for guiding the first holder 24 on the lower side.

Figure 10:
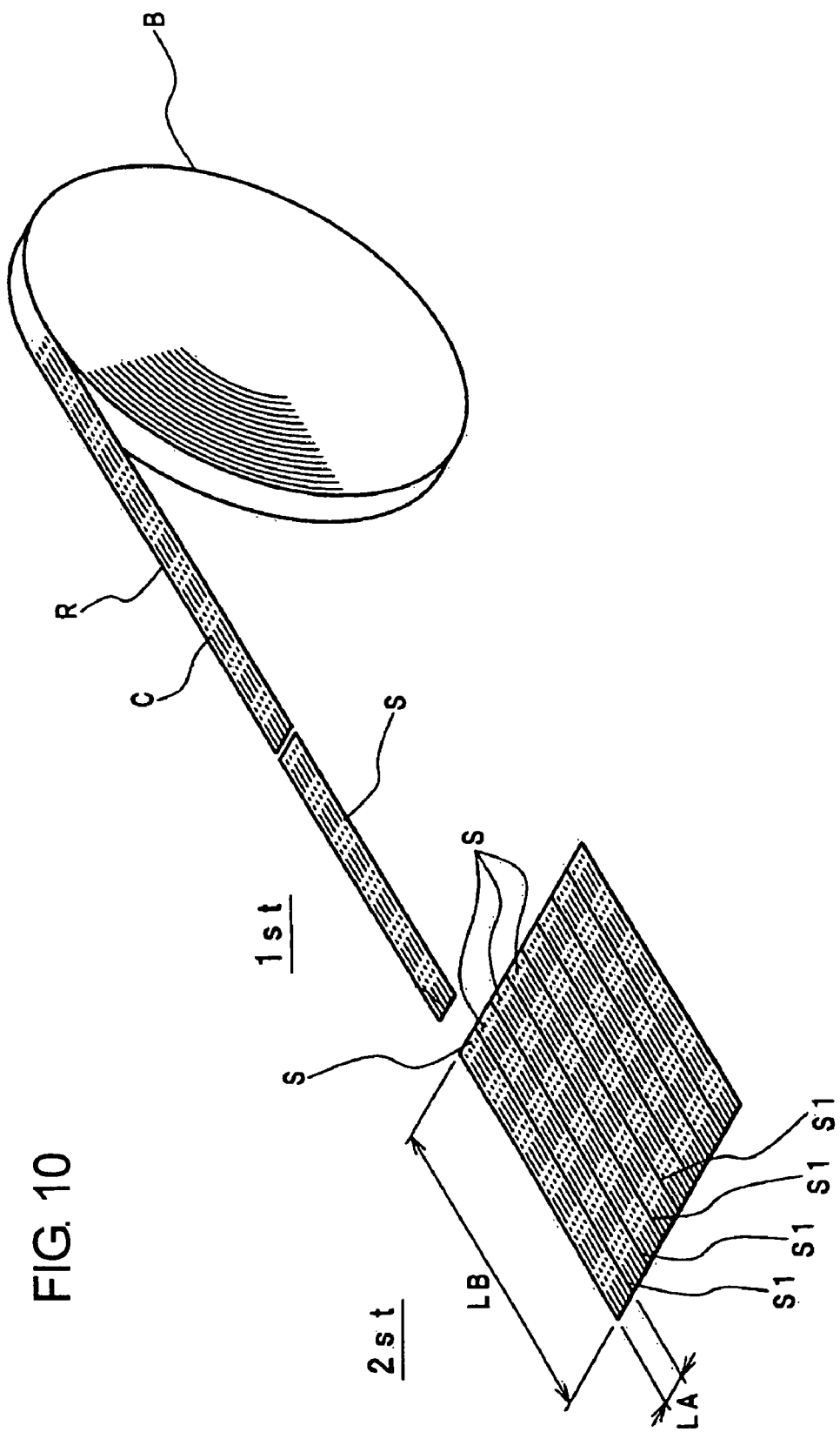
FIG. 10 is an explanatory view showing a feeding state of a ribbon.

As shown in FIG. 10, the foregoing rubber sheet S is made by cutting a ribbon R of a predetermined width LA which is scrolled around a bobbin B, to those strips of the aforementioned predetermined length LB which corresponds to a ply width which is determined in dependence on the kind, size and the like of the tires to be manufactured. The cutting is performed at right angles to the cords C embedded in each of those strips. The ribbon R is constituted by rubber-coating a plurality of fiber cords made of, e.g., polyester. The fiber cords C are placed under a dipping process for better property of adhesiveness with rubber. Although not shown, the rubber coating of the fiber cords C can be done by causing the fiber cords C to pass through an unvulcanized compound rubber layer which is extruded by a small extruding machine.

As shown in FIGS. 1 and 10, a cutting station 1st for cutting the ribbon R to those strips of the predetermined length LB is arranged to be next to the butt joint station 2st. The cutting station 1st is provided with supply means 70 for holding and supplying the ribbon R fed from the bobbin B, to the butt joint station 2st and cutting means 80 for cutting the ribbon R to those strips of the predetermined length LB corresponding to the ply width LB at right angles to the cords C. Rectangular or elongated rubber sheets S each having the width LA and the length LB are made by the cutting means 80 and are successively supplied by the supply means 70 to the butt joint station 2st. In this first embodiment, the elongated rubber sheets S are jointed in succession one after another at their side end edges extending in the lengthwise direction thereof, as best illustrated in FIG. 10, as described hereunder.

(Operation)

The operation of the first embodiment as constructed above will be described hereafter. In the following description of the operation, for better understanding, each rubber sheet S supplied to the second holding means 22 will be called "rubber sheet strip" whereas an aggregation of plural jointed rubber sheets S will be called "rubber sheet group or batch".

First of all, the end portion of the ribbon R in which the fiber cords are embedded in a rubber layer of the predetermined width LA is led to the cutting station 1st and is cut by the cutting means 80 to a rubber sheet strip S of the predetermined length (the body ply width) LB which is determined in dependence on the kind, size and the like of the tires to be manufactured. The rubber sheet strip S cut to the predetermined length LB is supplied by the supply means 70 to the butt joint station 2st (refer to FIGS. 1 and 10).

Figure 6:
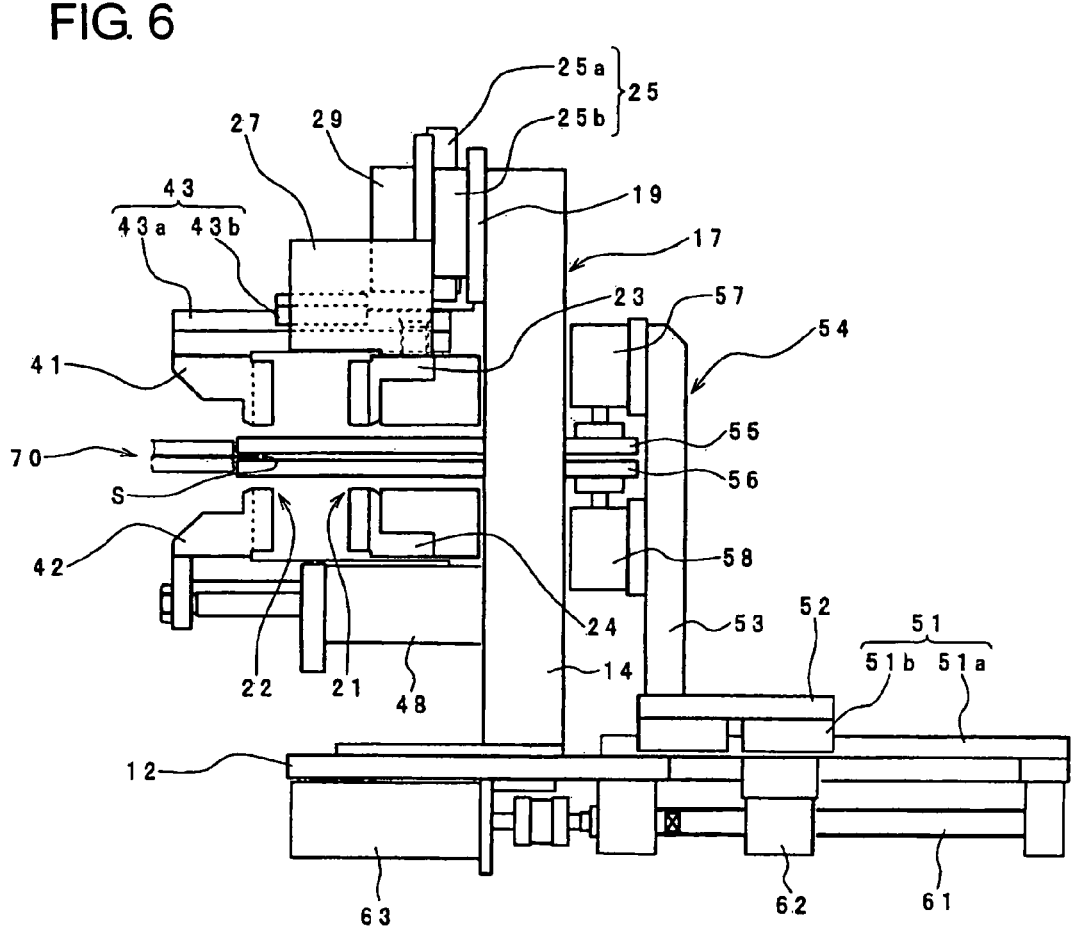
FIG. 6 is a view similar to FIG. 2 showing the apparatus in a state that a first rubber sheet has been supplied.

When the first rubber sheet strip S is supplied to the butt joint station 2st with its left side portion being held by the supply means 70 as viewed in FIG. 2, the electric motor 63 is driven, and the rotation of the electric motor 63 controllably moves the movable table 52 through the ball screw shaft 61 and the ball nut 62 from the original position toward the second holder means 22 in the Y-axis direction. Thus, as shown in FIG. 6, the movable table 52 is advanced to the position where the third holders 55, 56 can hold the right side portion of the rubber sheet strip S whose left side portion is being held by the supply means 70. In this state, the third holders 55, 56 are moved by the third cylinder actuators 57, 58 mounted on the movable table 52 to come close to each other, whereby the third holder 55, 56 hold the right side portion of the first rubber sheet strip S.

Only when the very first rubber sheet strip S is supplied in this way, the third holders 55, 56 remain vacant without holding any rubber sheet strip S and therefore, the movable table 52 is controllably moved so that the third holders 55, 56 go to fetch the supplied rubber sheet strip S directly.

When the right side portion of the rubber sheet strip S is held by the third holders 55, 56, the left side portion of the rubber sheet strip S is released from the holding by the supply means 70, in which state the electric motor 63 is driven in a direction opposite to the foregoing operation to retract the movable table 52 in the Y-axis direction. The movable table 52 is retracted to the position shown in FIG. 2 where the first holders 23, 24 can hold the joint end portion (the left side portion as viewed in FIG. 4) of the rubber sheet strip S whose right side portion being still held by the third holders 55, 56. Thus, a joint end surface S1 (shown in FIG. 10) of the first rubber sheet strip S is positioned to a position which recedes the slight amount (L1) in the Y-axis direction from the end surfaces of the comb-tooth shape rugged portions 31a, 32a of the first holders 23, 24.

Then, a second rubber sheet strip S cut to the predetermined length LB in the same manner as aforementioned is supplied to the butt joint station 2st. A joint end surface S1 (the right end surface as viewed in FIG. 4) of the second rubber sheet strip S supplied to the butt joint station 2st is thus placed between the second holders 41 and 42 and is positioned to the position where it recedes by the slight amount (L1) in the Y-axis direction from the right end surfaces of the comb-tooth shape rugged portions 45a, 46a of the second holders 41, 42. In this state, the first cylinder actuators 29, 30 are operated, and the first holders 23, 24 are vertically moved to come close toward each other while being guided along the linear guides 25, 25 in the Z-axis direction. Thus, the upper and lower surface of the joint end portion of the first rubber sheet strip S being held by the third holders 55, 56 are held (pinched) by the holder portions 31, 32 of the first holders 23, 24. It results from this that the first rubber sheet strip S is held by the holding portions 31, 32 at the position where the joint end surface S1 recedes by the slight amount (L1) in the Y-axis direction from the end surfaces of the comb-tooth shape rugged portions 31a, 32a of the first holders 23, 24, as indicated by the phantom line in FIG. 4.

As the first holders 23, 24 are vertically moved to come close to each other, the second holders 41, 42 are vertically moved bodily with the first holders 23, 24 through the connection blocks 27, 28 and the second cylinder actuators 47, 48 to come close to each other. Thus, the upper and lower surface of the joint end portion (i.e., the right end portion as viewed in FIG. 4) of the second rubber sheet strip S whose left side portion being still held by the supply means 70 are held (pinched) by the holder portions 45, 46 of the second holders 41, 42. Also in this case, the second rubber sheet strip S is held by the holder portions 45, 46 at the position where the joint end surface S1 (i.e., the right end surface) recedes by the slight amount (L1) in the Y-axis direction from the end surfaces of the comb-tooth shape rugged portions 45a, 46a of the second holders 41, 42, as indicated by the phantom line in FIG. 4.

Figure 7:
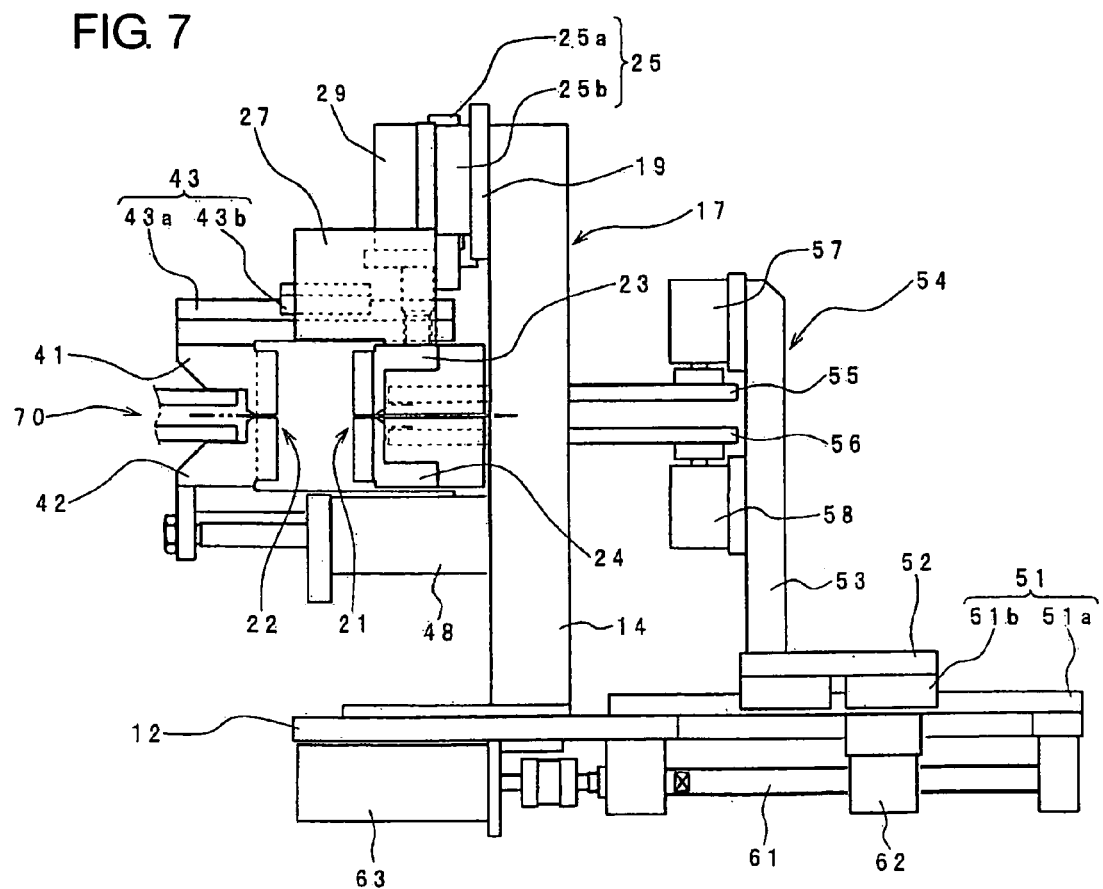
FIG. 7 is a view similar to FIG. 2 showing the apparatus in another state that the apparatus holds two rubber sheets.

When the two rubber sheet strips S are held respectively between the first holders 23 and 24 and between the second holders 41 and 42 as shown in FIG. 7, the third holders 55, 56 are operated to open by the third cylinder actuators 57, 58 and the second rubber sheet strip S is released from the holding by the supply device 70.

Subsequently, the second cylinder actuators 47, 48 are operated, and the second holders 41, 42 are horizontally moved toward the first holders 23, 24 while being guided by the linear guides 43, 44 in the Y-axis direction until the rugged portions 45a, 46a of the comb tooth shape formed on the second holders 41, 42 are respectively brought into complementary meshing with the rugged portions 31a, 32a of the comb tooth shape formed on the first holders 23, 24. In this way, as the rugged portions 45a, 46a of the comb tooth shape on the side of the second holders 41, 42 are complementarily entered into the rugged portions 31a, 32a of the comb tooth shape on the side of the first holders 23, 24 to a predetermined depth, the joint end surface S1 of the second rubber sheet strip S being held by the holder portions 45, 46 on the side of the second holders 41, 42 is pressured on and contacted with the joint end surface S1 of the first rubber sheet strip S being held by the holder portions 31, 32 on the side of the first holders 23, 24.

The stroke end of the second cylinder actuators 47, 48 has been set to give the both rubber sheet strip S a predetermined (e.g., one millimeter or so) pressuring allowance (ΔL). That is, the second holders 45, 46 are partly overlapped respectively with the first holders 23, 24 so that the rugged portions 45a, 46a of the comb tooth shape on the second holders 45, 46 are complementarily meshed with the rugged portions 31a, 32a of the comb tooth shape on the first holders 23, 24 to a predetermined depth of L1+ΔL. Thus, both rubber sheet strip S are pressured on each other through the distance of the predetermined pressuring allowance (ΔL), and thus, the joint end surfaces S1 can be pressure-contacted with each other with a strong pressure force in the state that the joint end portions of the both rubber sheet strips S are being held steadily, whereby the both rubber sheet strips S can be jointed reliably.

Because the second holders 41, 42 can respectively overlap with the first holders 23, 24 through the mutual meshing between the comb-tooth shape rugged portions 31a, 32a and the comb-tooth shape rugged portions 45a, 46a, it becomes possible to pressure-contact the joint end surfaces S1 of the both rubber sheet strips S with the strong pressuring force with the respective joint end portions of the both rubber sheet strips S being steadily held by the respective holder portions 31, 32, 45, 46 of the first and second holders 23, 24, 41, 42. Accordingly, the joint end portions can be prevented from having any bulge thereon, and the flatness at the joint end portions can be improved. Further, since any bulge does not occur, it becomes unnecessary to roll or smoothen the bulge portion with heat being applied to the rubber sheet strips S, so that the rubber sheet strips S can be kept uniform in quality without being degenerated.

In this manner, the second cylinder actuators 47, 48 are operated to their stroke ends, and the joint end surfaces S1 of the both rubber sheet strips S are pressure-contacted to be jointed with each other. Then, the third holders 55, 56 are moved by the third cylinder actuators 57, 58 to come close to each other, whereby the jointed rubber sheet batch S can be held at the right side portion of the first rubber sheet strip S. At the same time, the first cylinder actuators 29, 30 are operated, whereby the first holders 23, 24 and the second holders 41, 42 are vertically moved to open while being guided along the linear guides 25, 26 in the Z-axis direction, thereby to release the rubber sheet batch S from the holding thereby.

Figure 9:
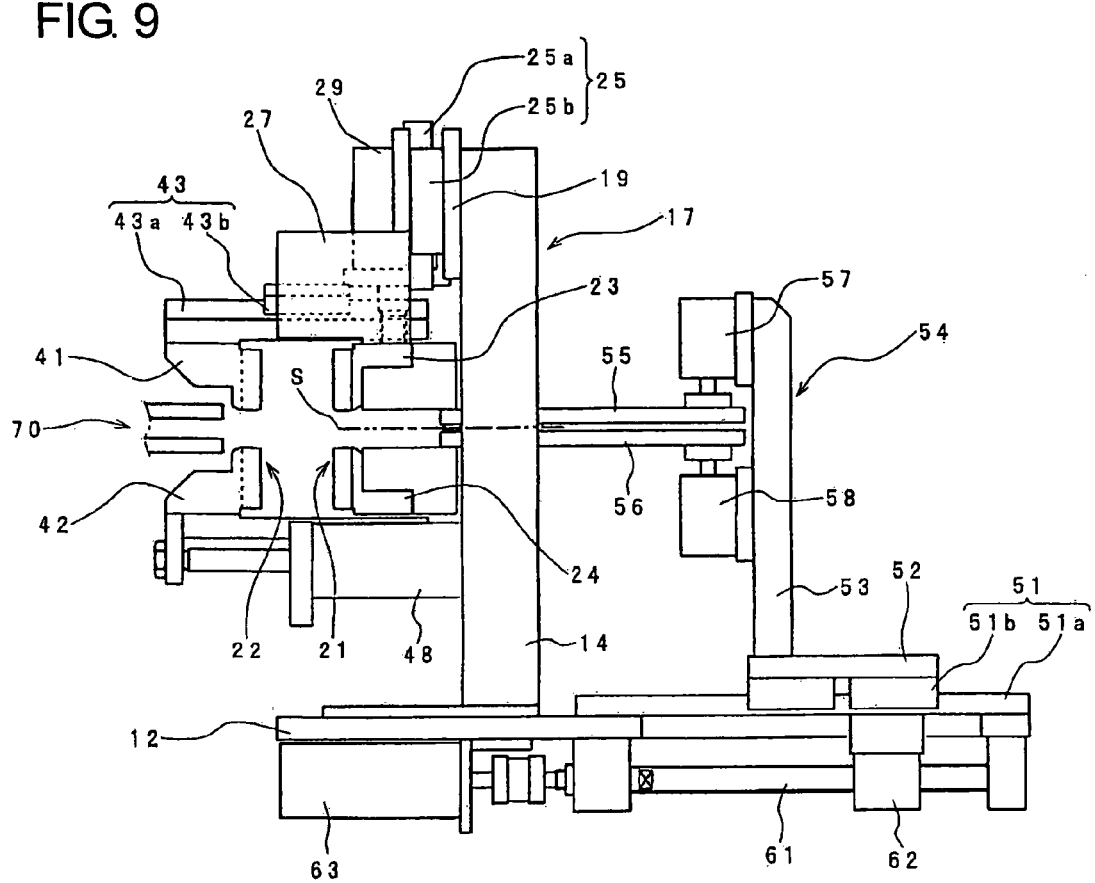
FIG. 9 is a view similar to FIG. 2 showing the apparatus in a further state that the jointed rubber sheet is sent out by a predetermined distance.

Upon the releasing of the rubber sheet batch S from the holding by the first holders 23, 24 and the second holders 41, 42, the electric motor 63 is operated to retract the third holders 55, 56 together with the movable table 52 by a stroke (LA) corresponding to the width dimension of the rubber sheet piece S in the Y-axis direction. Thus, since the rubber sheet batch S being held by the third holders 55, 56 is retracted by the width dimension (LA) of the rubber sheet piece S in the Y-axis direction as shown in FIG. 9, it results that a new or next joint end surface S1 of the rubber sheet batch S is positioned to the position where it recedes by the slight amount L1 in the Y-axis direction from the end surface of the comb-tooth shape rugged portions 31*a*, 32*a* on the first holders 23, 24.

When a third rubber sheet strip S is then supplied between the second holders 41 and 42 in the same manner as the foregoing operation, the third rubber sheet strip S is held by the second holders 41, 42, and at the same time, the rubber sheet batch S composed of the plural jointed rubber sheet strips S is held by the first holders 23, 24. In this state, the second holders 41, 42 are moved toward the first holders 23, 24 in the Y-axis direction, whereby in the same manner as described above, the joint end surface S1 of the third rubber sheet strip S is pressure-contacted with the joint end surface S1 of the rubber sheet batch S thereby to joint both of them together.

Figure 8:
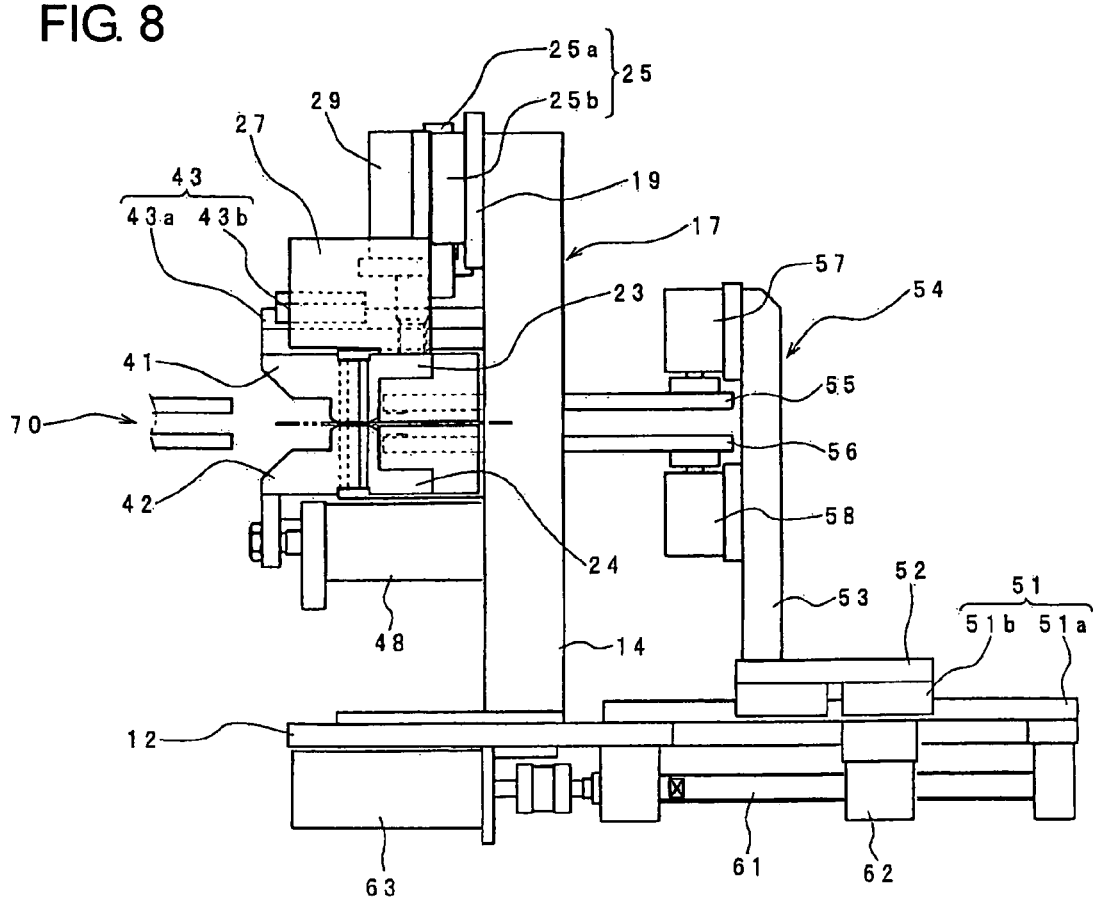
FIG. 8 is a view similar to FIG. 2 showing the apparatus in still another state that the two rubber sheets have been jointed.

During the jointing step of the rubber sheet strips S, the movable table 52 is advanced by the operation of the electric motor 63 by the stroke corresponding to the width dimension LA of the rubber sheet strip S in the Y-axis direction to feed the third holders 55, 56 to the position shown in FIG. 8 by the predetermined amount (LA) relative to the rubber sheet batch S. It result from this that the third holders 55, 56 can come to hold the rubber sheet batch S at the position which has a predetermined relation with the next joint end surface S1 of the rubber sheet batch S at all times. That is, by retracting the third holders 55, 56 holding the rubber sheet batch S by the width dimension LA of the rubber sheet strip S in the Y-axis direction, it becomes possible to position the next joint end surface S1 of the rubber sheet batch S to the predetermined position at all times.

By repetitively performing the foregoing operation, rubber sheet strips S are successively jointed to one end surface of the rubber sheet batch S. When the rubber sheet batch S of a predetermined length (N×LA) corresponding to the body ply for one tire is manufactured by using the rubber sheet strips S of a predetermined number (N), the rubber sheet butch S (i.e., plane body ply sheet) is pulled by sheet drawing means (not shown) from between the third holders 55, 56. Thereafter, the rubber sheet butch S is placed on a tray (not shown) and is transferred onto a tire shaping drum of another jointing apparatus (not shown) which will be described as a third embodiment of the present invention later.

It is to be noted that the body ply sheet S using the ribbon R may be manufactured by using a ribbon which has been prepared in advance or may be manufactured as the step to follow a step at which the ribbon R is manufactured in a parallel time relation.

Second Embodiment

Figure 11:
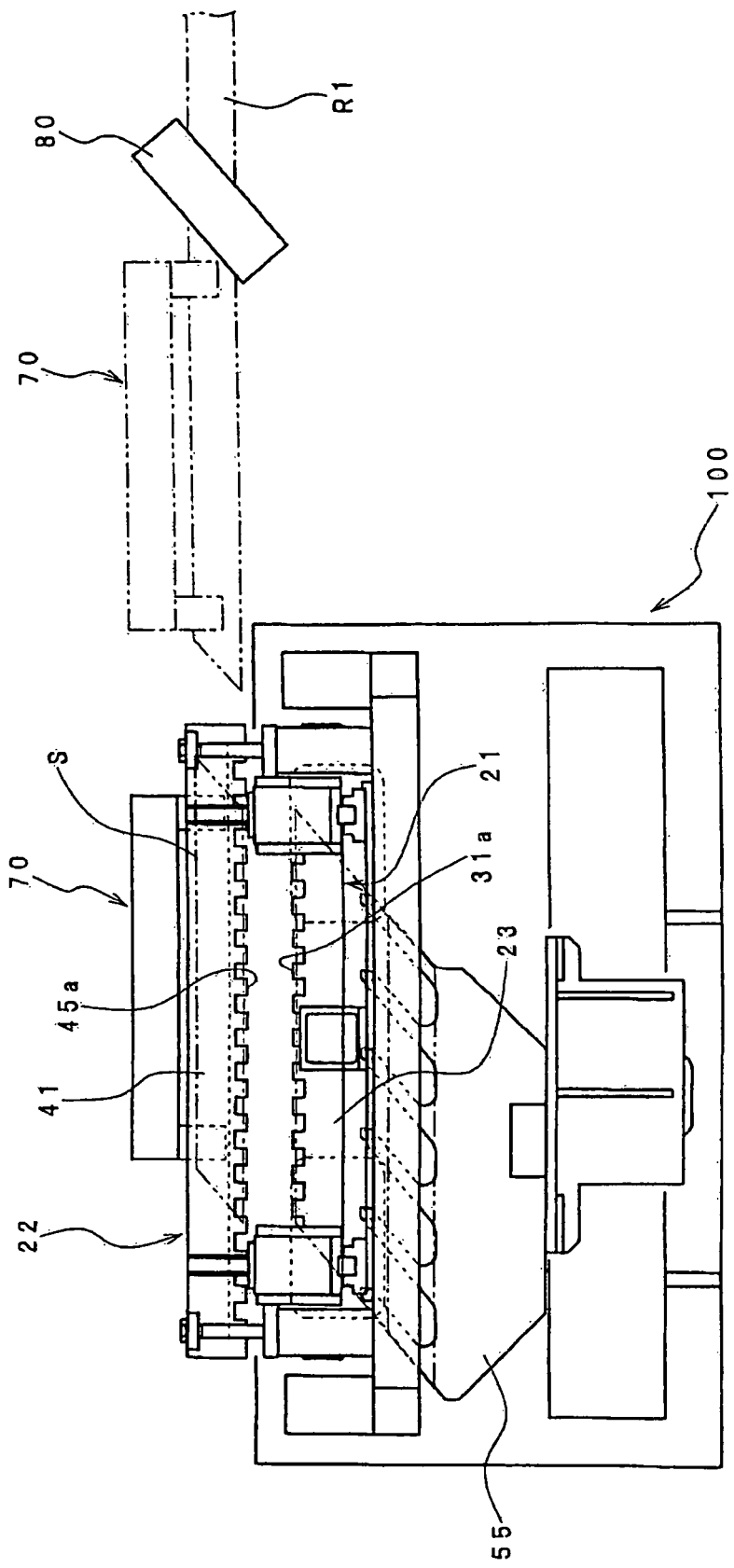
FIG. 11 is a plan view of a rubber sheet jointing apparatus in a second embodiment according to the present invention.
Figure 12:
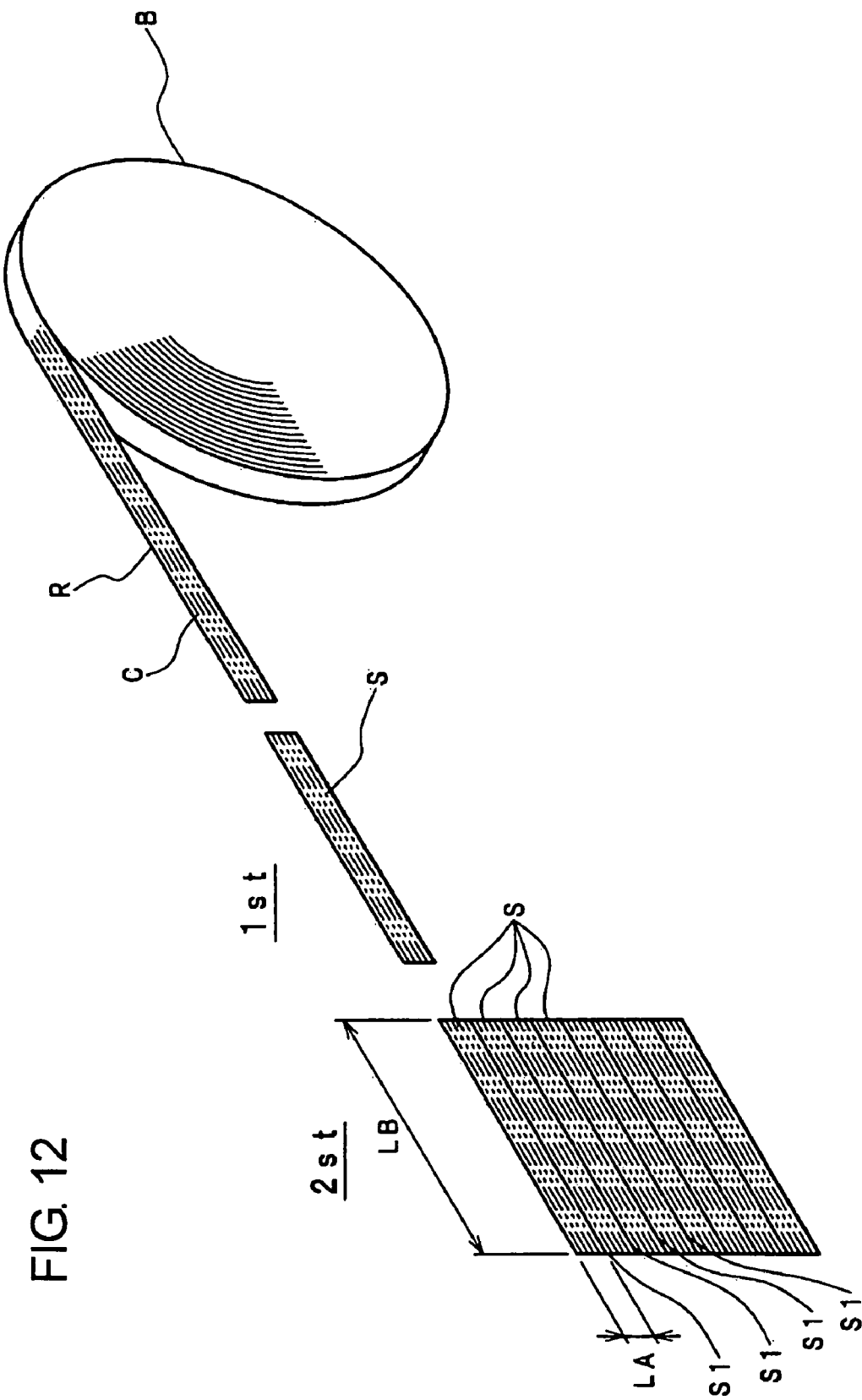
FIG. 12 is an explanatory view showing a feeding state of a ribbon in the second embodiment.

FIGS. 11 and 12 show a second embodiment according to the present invention, which exemplifies the manufacturing of sheets for belts of automotive tires with steel cords embedded therein.

A jointing apparatus 100 in this second embodiment uses a ribbon R of a predetermined width LA in which plural number of steel cords each made by intertwisting plated wires are rubber-coated by being made to pass through an unvulcanized composite rubber layer which is extruded from a die of a rubber extruding machine (not shown). The ribbon R sent out from a bobbin B is successively cut by cutting means 80 arranged at a cutting station 1*st*, to those strips S of a predetermined length LB which corresponds to a belt width determined by the specification of the tires to be manufactured. The cutting angle at which the ribbon R is cut coincides with a belt angle which is inclined at a predetermined angle with the cords C which are arranged in parallel with the longitudinal direction of the ribbon R. Each rubber sheet strip S so cut is supplied by supply means 70 to a butt joint station 2*st* and is placed between a pair of second holders 41, 42 (reference numeral 42 not shown) of second holding means 22 to be held thereby. In this state, in the same manner as described in the foregoing first embodiment, the second holders 41, 42 are moved relative to a pair of first holders 23, 24 (reference numeral 24 not shown) of first holding means 21 in the Y-axis direction (in the upper-lower direction as viewed in FIG. 11) and are advanced to a position where comb-tooth shape rugged portions 45*a* (46*a* not shown) of the second holders 41, 42 are brought into meshing respectively with comb-tooth shape rugged portions 31*a* (32*a* not shown) of the first holders 23, 24. Thus, a joint end surface S1 of a rubber sheet strip S being held by the second holders 41, 42 is pressure-contacted with a joint end surface S1 of another rubber sheet strip S or a rubber sheet batch S being held by the first holders 23, 24 thereby to join the rubber sheet strip S with said another rubber sheet strip S or with the rubber sheet batch S.

Third holders 55, 56 (reference numeral 56 not shown) holding the jointed rubber sheet batch S are movable in the Y-axis direction as well as in an X-axis direction (the left-right direction as viewed in FIG. 11) so that the rubber sheet batch S can be sent out along a predetermined angle inclined relative to the axes of the cords C. Therefore, each time a rubber sheet strip S is jointed, the third holders 55, 56 are moved by the width dimension LA of the rubber sheet strip S in the Y-axis direction and at the same time, by a distance depending on the inclination angle in the X-axis direction, whereby the joint end surface S1 of the rubber sheet batch S can be positioned to a predetermined position at all times.

In this way, a plane belt sheet of the predetermined width for one tire is manufactured and is placed by sheet drawing means (not shown) on a tray to be transferred to a shaping drum such as that referred to in the following third embodiment of the present invention.

Each of the aforementioned embodiments describes the example wherein jointing is performed between the body ply sheets each having the fiber cords embedded in the rubber sheet strip S or between the tire belt sheets each having the steel cords embedded in the rubber sheep strip S. However, the jointing apparatus and method according to the present invention is applicable to the manufacturing of a composite rubber sheet which is constituted by jointing rubber sheet strips each not having any cord embedded therein.

Of course, the specific constructions, support structures and operations of the first holding means 21 and the second holding means 22 described in the foregoing embodiments are not limited to those described in the foregoing embodiments and may take various forms without departing from the gist of the present invention.

As described hereinabove, in the foregoing embodiments, since the holder portions 31, 32, 45, 46 which are able to overlap to mesh with each other are provided on the mutually facing surfaces of the first and second holding means 21, 22 for respectively holding the joint end portions of the two rubber sheets S to be jointed with each other, the jointing of the joint end surfaces S1 with each other can be realized with the joint end portions of the two rubber sheets S being held over the entire parts thereof. Thus, even when the both rubber sheets S are pressure-joined with a strong pressuring force, any bulge can be prevented from occurring on the jointed portion. Therefore, it can be realized to easily manufacture rubber sheet blanks which are uniform in thickness and excellent in flatness. In addition, because no heat is applied to the rubber sheets S, the same do not deteriorate in quality, so that it can be realized to easily obtain the rubber sheet blanks which are uniform also in quality.

In the foregoing embodiments, since the apparatus is constructed to joint the end surfaces S1 of the two rubber sheets S by allowing the holder portions 31, 32, 45, 46 to overlap with each other through complementary meshing of the rugged portions 31a, 32a, 45a, 46a each taking the comb tooth shape, it can be realized to pressure-contact the joint end surfaces S1 of the rubber sheets S steadily and to improve the jointing accuracy.

In the foregoing embodiments, since the wave claws 31b, 32b, 45b, 46b are formed on the respective surfaces of the holder portions 31, 32, 45, 46 which contact with the rubber sheets S, to bite the rubber sheets S, it becomes possible to joint the rubber sheets S securely with a strong pressure force.

In the foregoing embodiments, since the relative moving amount given by the operating means (i.e., the second cylinder actuators) 47, 48 between the first and second holding means 21, 22 is set to give the predetermined pressuring allowance (ΔL) between the two rubber sheets S being respectively held by the first and second holding means 21, 22, it becomes possible to heighten the jointing strength of the rubber sheets S nevertheless any bulge hardly occurs at the joint end portions of the rubber sheets S.

In the foregoing embodiments, since the holder portions 31, 32, 45, 46 which are able to overlap to mesh with each other are respectively provided on the mutually facing surfaces of the first and second holders 23, 24, 41, 42, it becomes possible to pressure-contact the joint end surfaces S1 with each other with the two rubber sheets S being held over the entire parts of the joint end portions thereof, and hence, even when the both rubber sheets S are pressure-joined with a strong pressuring force, any bulge can be prevented from occurring on the joint end portions. In addition, the third holders 55, 56 for holding the rubber sheet S delivered to and from the first holders 23, 24 are fed by the predetermined amount LA whenever fed, it becomes possible to position a new or next joint end surface S1 of the jointed rubber sheet S to which another rubber sheet S is to be jointed, to the predetermined position at all times. Therefore, the jointing of the rubber sheets S can be performed efficiently only by holding a newly supplied rubber sheet strip S by the second holders 41, 42 and then by moving the second holders 41, 42 relative to the first holders 23, 24.

In the foregoing embodiments, the first holders 23, 24 holding the joint end portion of one of the two rubber sheets S and the second holders 41, 42 holding the joint end portion of the other rubber sheet S are relatively moved to the position where they partly overlap with each other, to joint the both rubber sheets S, and the jointed rubber sheet S is fed by the predetermined amount LA relative to the first holders 23, 24 to position a new or next joint end surface S1 of the jointed rubber sheet S to which another rubber sheet S is to be jointed, to the predetermined position at all times. Thus, even when the both rubber sheets S are pressure-joined with a strong pressuring force, any bulge can be prevented from occurring at the joint end portions. This makes it unnecessary to perform a leveling or smoothening step of rolling or leveling any bulge which would otherwise be formed on the rubber sheet S after the jointing step. Accordingly, it can be realized to the jointing method capable of efficiently manufacturing the rubber sheet blanks which are uniform in thickness and excellent in flatness.

Third Embodiment

Hereafter, description will be made regarding a rubber sheet jointing apparatus and method which is practiced for jointing the opposite ends of a rubber sheet 115, that is, for jointing the first and last or N-th rubber sheet strips of the rubber sheet S manufactured in any of the foregoing first and second embodiments. Although the rubber sheet jointing apparatus and method in the third embodiment according to the present invention is preferably applied to the manufacturing of body plies for automotive tires, the apparatus and method is not limited only to any particular filed of application.

Figure 13:
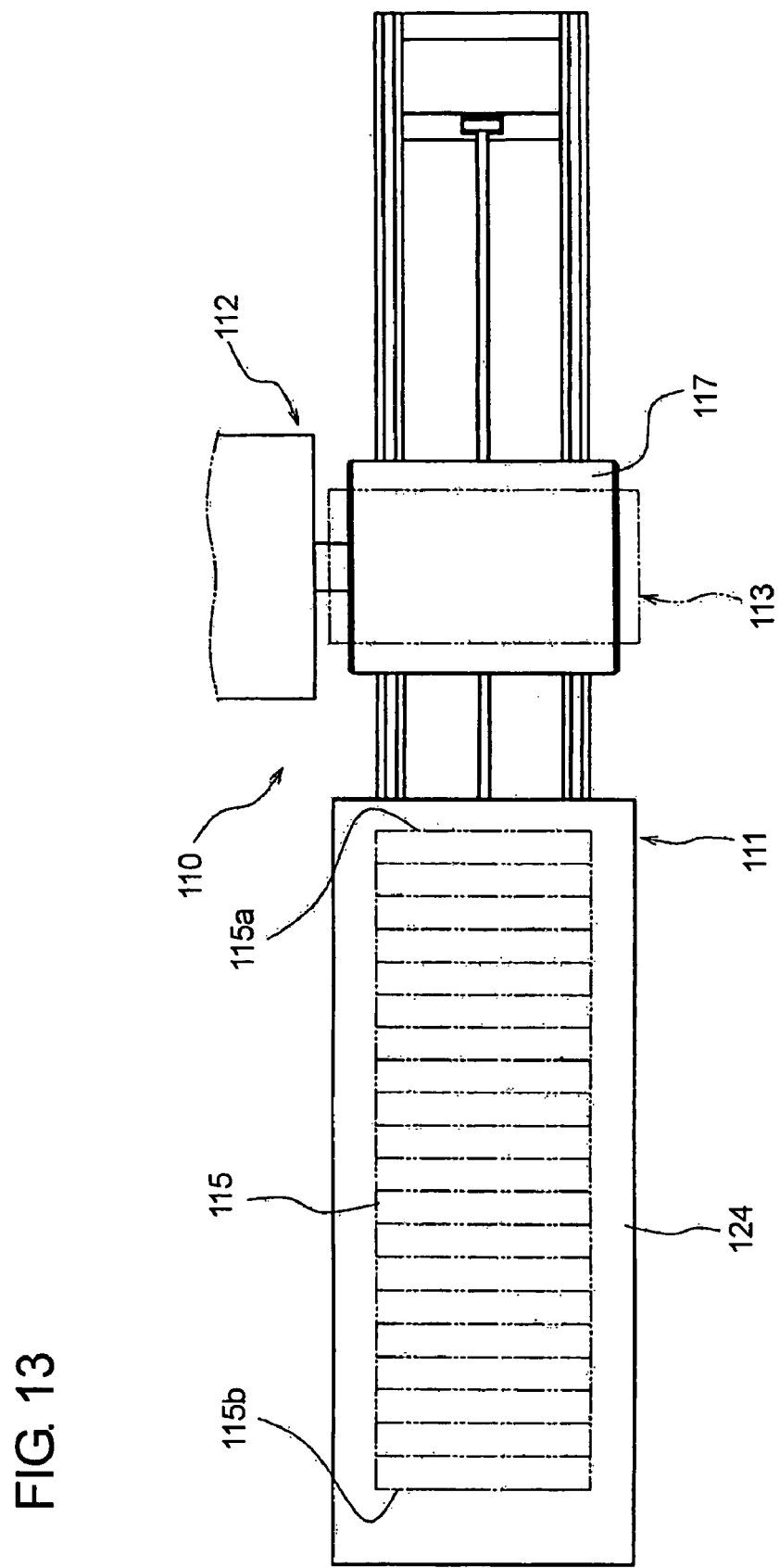
FIG. 13 is a plan view of a rubber sheet jointing apparatus in a third embodiment according to the present invention.

Referring now to FIG. 13, there is schematically shown a manufacturing apparatus 110 for cylindrical or round rubber sheet blanks such as body or carcass plies for automotive tires. The terms "carcass ply" and "body ply" are interchangeably used in the same meaning herein. The rubber sheet 115 is of a plane form and will be called "plane rubber sheet 115" occasionally in the following description.

The manufacturing apparatus 110 is composed primarily of a rubber sheet transfer device 111 for transferring a cord-reinforced rubber sheet 115 which is to become a carcass or body ply of a tire, a rubber sheet winding device 112 for winding the rubber sheet 115 on the circumferential surface of a shaping drum 117, and a rubber sheet jointing device 113 for jointing the circumferential opposite ends of the rubber sheet 115.

Figure 14:
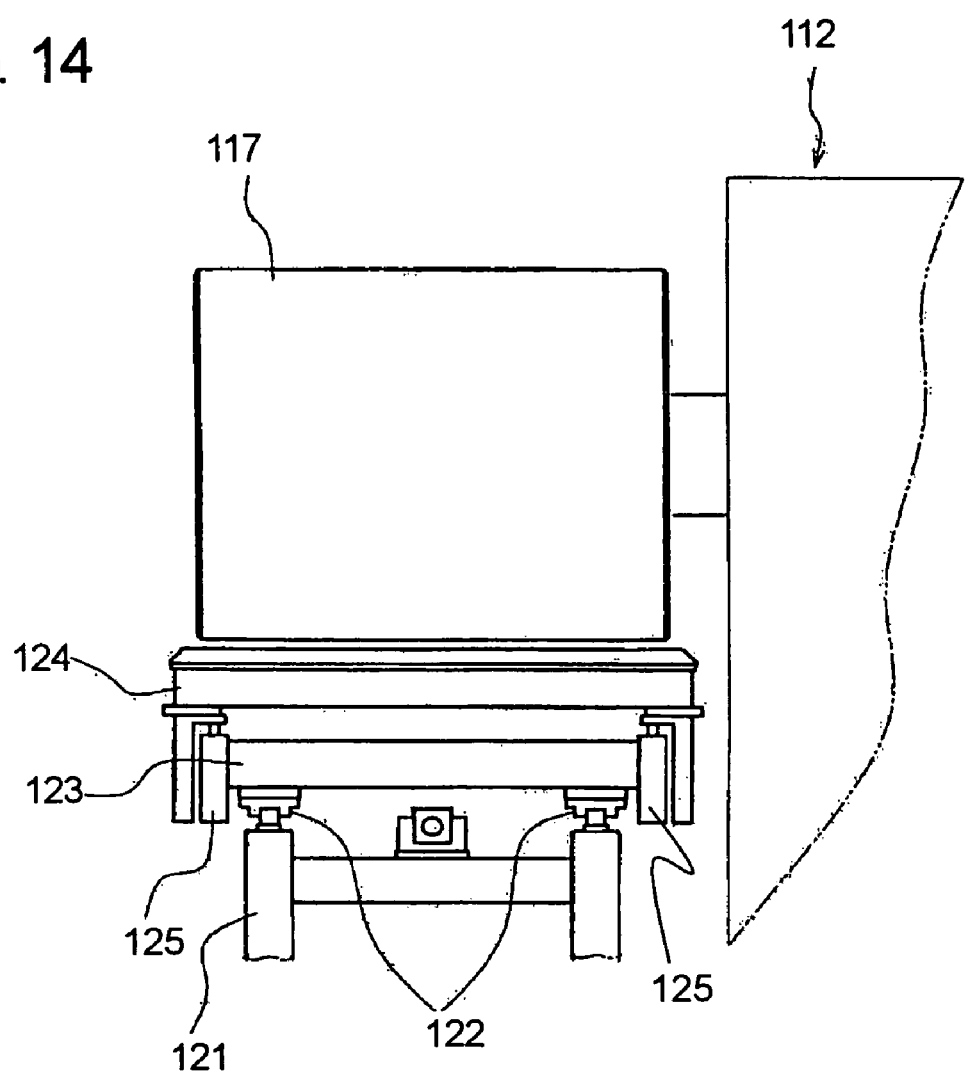
FIG. 14 is a side view of the apparatus shown in FIG. 13.

As shown in FIG. 14, the rubber sheet transfer device 111 is provided with a transfer table 123 movably supported on a pair of rails 122 and a support table 124 vertically movably supported on the transfer table 123, and the rubber sheet 115 is placed on the support table 124. In the present embodiment, it is assumed that the rubber sheet 115 is made by cutting an unvulcanized rubber ribbon which has been scrolled around a bobbin (not shown) in advance, to those sheets of a predetermined length determined in dependence on the kind, size and the like of the tires to be manufactured. However, in a modified form, the rubber sheet 115 may be made by joining plural elongated rubber sheet strips one after another at their side surfaces parallel to the lengthwise direction of the rubber sheet strips, as described in the foregoing embodiments.

The rubber sheet winding device 112 rotatably supports a shaping drum 117 whose construction will be referred to later in detail. The support table 124 with the rubber sheet 115 placed thereon is transferred together with the transfer table 123, and when one end (i.e., a winding start end portion) 115a is positioned under the axis of the shaping drum 117, the support table 124 is moved upward by an elevation cylinder actuators 125. Thus, the winding start end portion 115a of the rubber sheet 115 is brought into contact with the circumferential surface of the shaping drum 117. In this state, the shaping drum 117 is rotated, in synchronous relation with which the rubber sheet transfer device 111 is further moved forward. As a consequence, the rubber sheet 115 is wound as one turn on the circumferential surface of the shaping drum 117, wherein the winding start end portion 115a of the rubber sheet 115 becomes to face a winding terminal end portion 115b thereof with a slight clearance therebetween.

Figure 17:
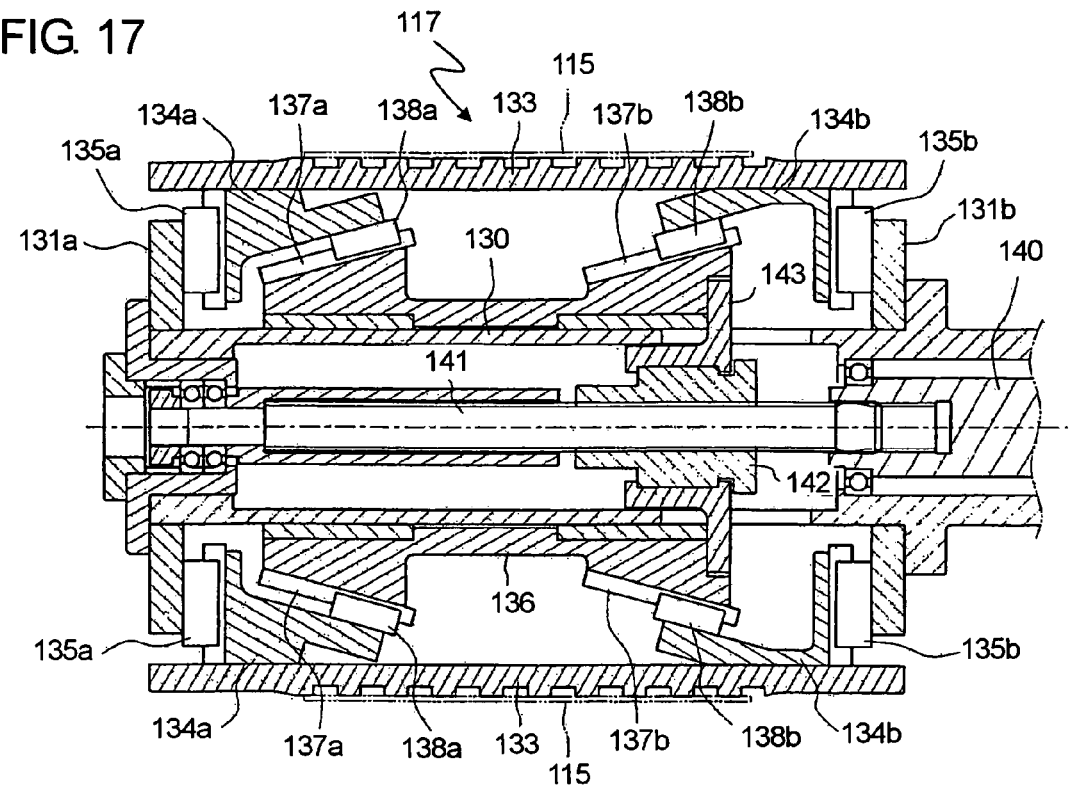
FIG. 17 is a longitudinal sectional view of a shaping drum taken along the line B-B in FIG. 15.

Next, the structure of the shaping drum 117 will be described with reference to FIG. 17. The shaping drum 117 is provided with a shaft sleeve 130 and a pair of discs 131a, 131b secured to the axial opposite ends of the shaft sleeve 130. The shaft sleeve 30 is rotatably carried on the rubber sheet winding device 112 and is rotatable by rotation drive means (not shown) through a predetermined angle.

A plurality of segments 133 arranged at an equiangular distance circumferentially of the shaft sleeve 130 are carried between the pair of discs 131a, 131b to be movable in radial directions. Brackets 134a, 134b are secured at both axial end portions on the internal surface of each segment 133 and are guided and supported on the axially inside surfaces of the respective discs 131a, 131b to be movable radially. A drum diameter altering member 136 of a generally cylindrical shape is fit on the external surface of the shaft sleeve 130 to be axially movable relative thereto, and slant cam members 137a, 137b inclined at a predetermined angle with the axis of the drum diameter altering member 136 are formed at both axial end portions of the circumferential surface of the drum diameter altering member 136. The brackets 134a, 134b which are attached to the internal surface of each segment 133 are guided along the slant cam members 137a, 137b through guide members 138a, 138b, respectively.

An adjuster shaft 140 is rotatably supported inside the shaft sleeve 130 to pass through the same and is rotatable by rotation drive means (not shown). Inside the shaft sleeve 130, a ball screw shaft 141 is rotatably supported and is connected to an inner end of the adjuster shaft 140. The ball screw shaft 141 has screw-engaged therewith a nut 142, which is connected with the drum diameter altering member 136 through a connection plate 143.

With the construction as aforementioned, when the ball screw shaft 141 is rotated upon rotation of the adjuster shaft 140, the drum diameter altering member 136 is axially moved through the nut 142 and the connection plate 143. This causes the respective segments 133 to synchronously move in radial directions intersecting the axis of the shaft sleeve 130, whereby adjustment is performed to alter the drum diameter of the shaping drum 117 constituted by the gathering of the plural segments 133.

Figure 18:
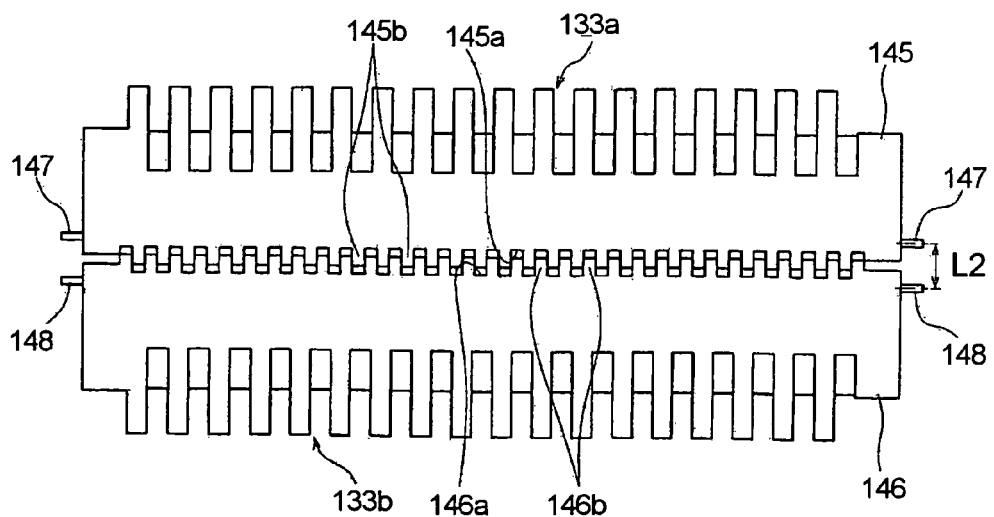
FIG. 18 is a plan view of a part of the external surface of the shaping drum as viewed in the direction C in FIG. 16.

In order to cover or fill the space which would otherwise be made between every two adjoining segments 133 in connection with the alteration adjustment in the drum diameter of the shaping drum 117, rugged portions 133a, 133b of a predetermined depth as shown in FIG. 18 are formed respectively at the both end portions in the circumferential direction of each segment 133, and the adjoining segments 133 can complementarily overlap with each other through the meshing of the rugged portions 133a, 133b. Thus, the external surface of the shaping drum 117 can be formed to continue in the circumferential direction.

Of the foregoing plural segments 133 arranged circumferentially, a pair of jointing segments 145, 146 which correspond to seams at the circumferential opposite end portions of the rubber sheet 115 respectively have at their facing end surfaces rugged portions 145a, 146a of a comb tooth shape formed to a predetermined depth, and these rugged portions 145a, 146a of the comb tooth shape can complementarily mesh with each other. Thus, the jointing segments 145, 146 have formed at their external surfaces holder portions 145a, 145b which are capable of holding the circumferential opposite end portions of the rubber sheet 115 at convex portions of the comb tooth shape. In this way, by overlapping the pair of jointing segments 145, 146 with each other through the complementary meshing between the comb-tooth shape rugged portions 145a, 146a, it becomes possible to joint the circumferential opposite end portions of the rubber sheet 115 with each other with the jointing segments 145, 146 holding the entire parts of the both extreme end portions in the circumferential direction of the rubber sheet 115.

Figure 21:
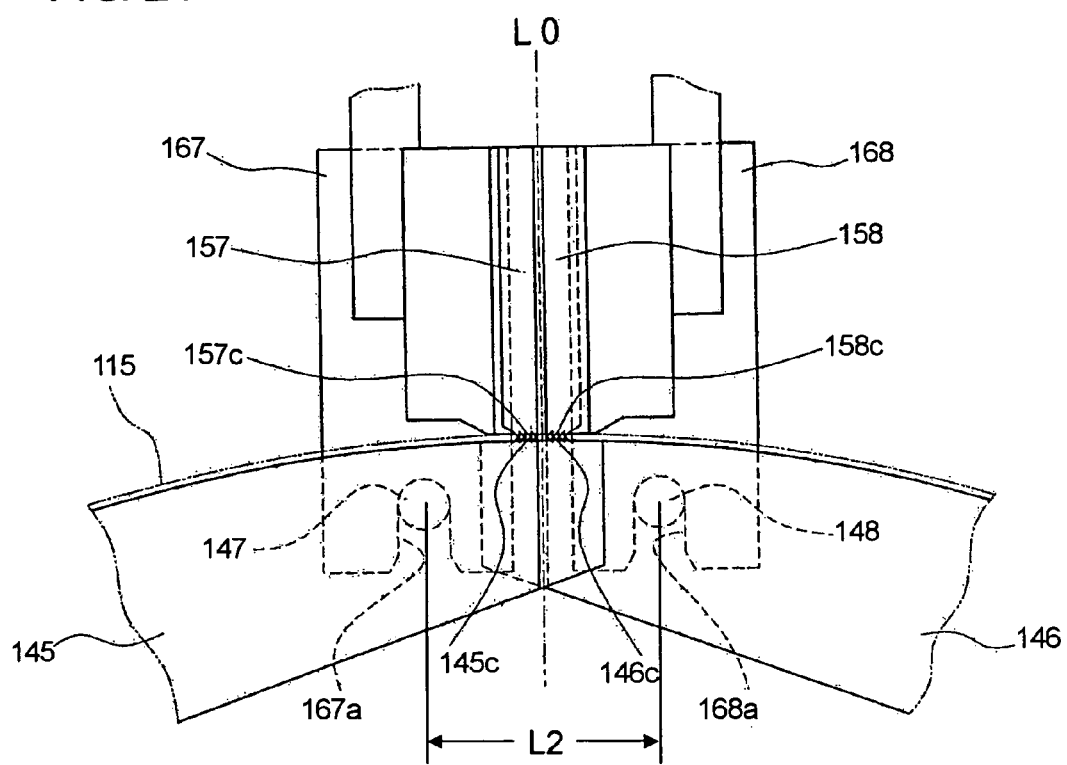
FIG. 21 is a fragmentary view showing the operational state of a part of the rubber sheet jointing device in an exaggerated scale.

As shown in FIG. 21, the holder portions 145a, 145b have formed thereon wave claws 145c, 146c such as, e.g., saw tooth claws of a minute height which bite the surfaces at the circumferential opposite end portions of the rubber sheet 115 so that the surfaces at the circumferential opposite end portions do not retract relative to the holder portions 145a, 145b during the jointing operation.

Each of the pair of jointing segments 145, 146 protrudes engaging pins 147, 148 from the axial opposite end portions thereof. The distance (L2) in a tangential direction of the shaping drum 117 (e.g., in the circumferential direction) between the engaging pins 147, 148 are varied by the movements of the segments 145, 146 in the radial directions, that is, by the increase or decrease of the drum diameter of the shaping drum 117. Thus, when the drum diameter is decreased, the circumferential opposite end portions of the rubber sheet 15 which portions are being held by the jointing segments 145, 146 are brought into contact with each other.

Figure 15:
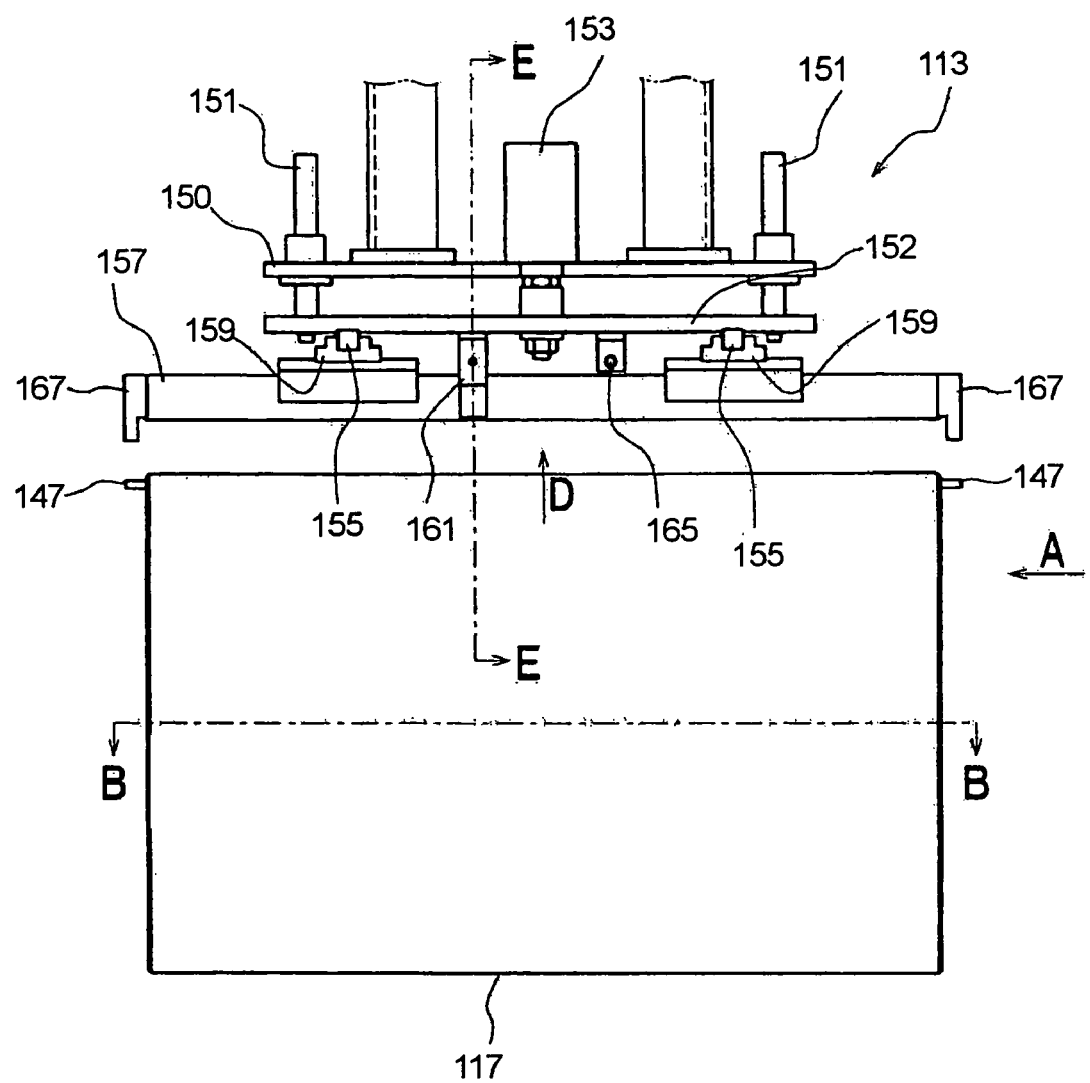
FIG. 15 is a front view of a rubber sheet jointing device incorporated in the apparatus.
Figure 16:
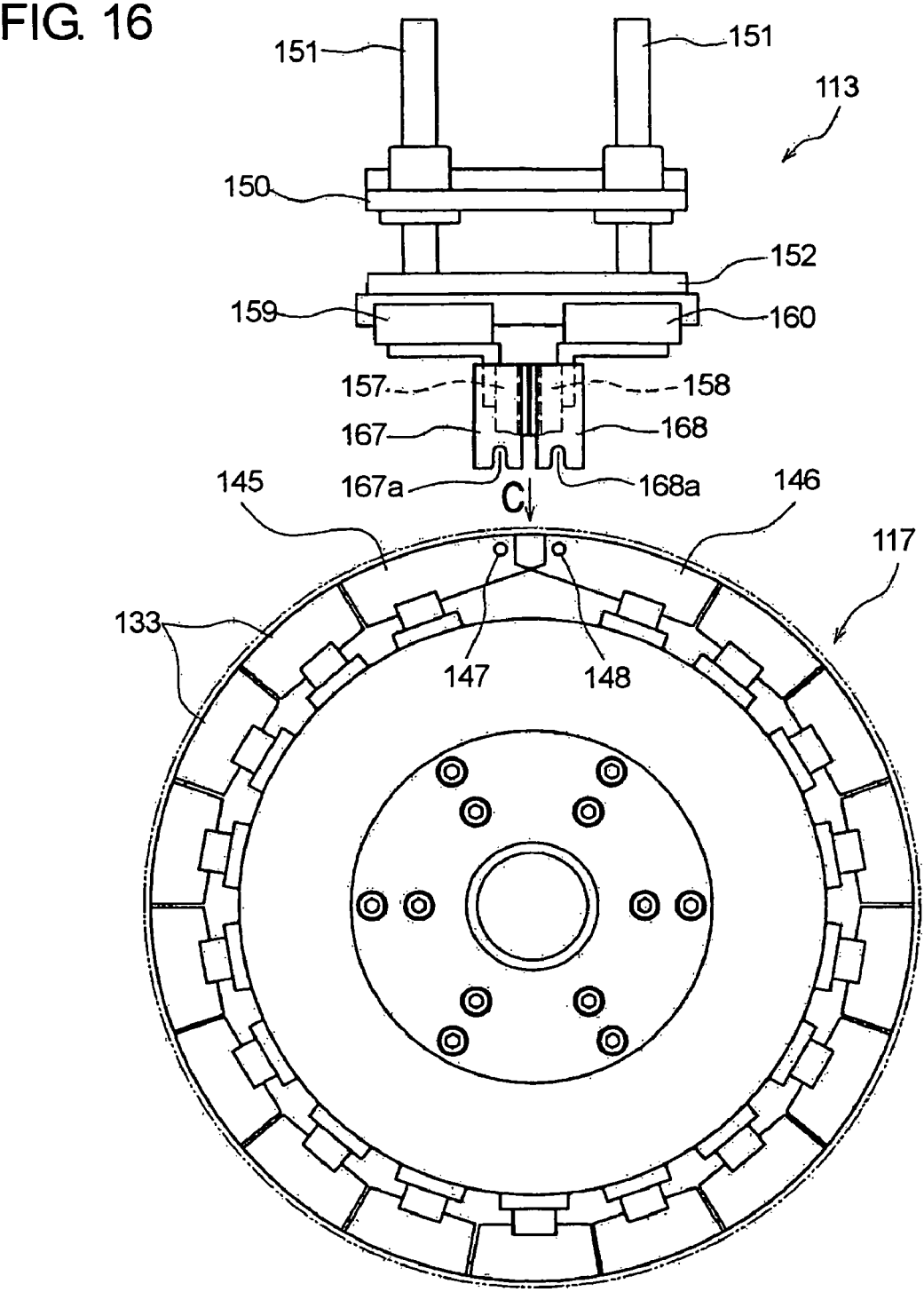
FIG. 16 is a side view of the rubber sheet jointing device as viewed in the direction A in FIG. 15.

Next, with reference to FIGS. 15, 16 and 19, description will be made regarding the construction of the rubber sheet jointing device 113 for jointing the circumferential opposite end portions of the rubber sheet 115 being wound around the shaping drum 117. The rubber sheet jointing device 113 is arranged over the shaping drum 117, and a fixed frame 150 thereof guides a vertically movable member 152 through a plurality of guide bars 151 in a vertical direction (in a radial direction of the shaping drum 117). The vertically movable member 152 is movable by a pressuring cylinder actuator 153 mounted on the fixed frame 150 toward and away from the shaping drum 117. A pair of guide rails 155 respectively constituting linear guides are mounted on an end (lower end) of the vertically movable member 152 to extend tangentially of the shaping drum 117, and two horizontally movable members 157, 158 are mounted on the guide rails 155 through guide blocks 159, 160 to come close to or away from each other in a tangential direction (the circumferential direction) of the shaping drum 117.

That is, the two horizontally movable members 157, 158 are arranged to face with each other with the vertical axis (L0) (refer to FIG. 21) therebetween and have the length corresponding approximately to the length of the shaping drum 117 in the axial direction of the same. As best shown in FIG. 19, rugged portions 157a, 158a each taking a comb tooth shape are formed on the mutually facing end surfaces of the respective horizontally movable members 157, 158 to a predetermined depth and are able to complementarily mesh with each other. Thus, pressuring portions 157b, 158b are formed on the lower surfaces of the horizontally movable members 157, 158 for pressuring the circumferential opposite end portions of the rubber sheet 115 by the rugged portions 157a, 158a of the comb tooth shape over the entire lengths thereof. In this way, by partly overlapping the pair of horizontally movable members 157, 158 through the complementary meshing between the rugged portions 157a, 158a of the comb tooth shape, it becomes possible to joint the circumferential opposite end surfaces of the rubber sheet 115 with the pressuring portions 157b, 158b of the horizontally movable members 157, 158 pressuring the circumferential opposite end edge portions of the rubber sheet 115 downward.

As shown in FIG. 21 in detail, the pressuring portions 157b, 158b have formed thereon wave claws 157c, 158c such as, e.g., saw tooth claws of a minute height which bite the external surfaces at the circumferential opposite end portions of the rubber sheet 115 so that the circumferential opposite end portions do not retract relative to the pressuring portions 157b, 158b to separate from each other during the jointing operation.

Figure 19:
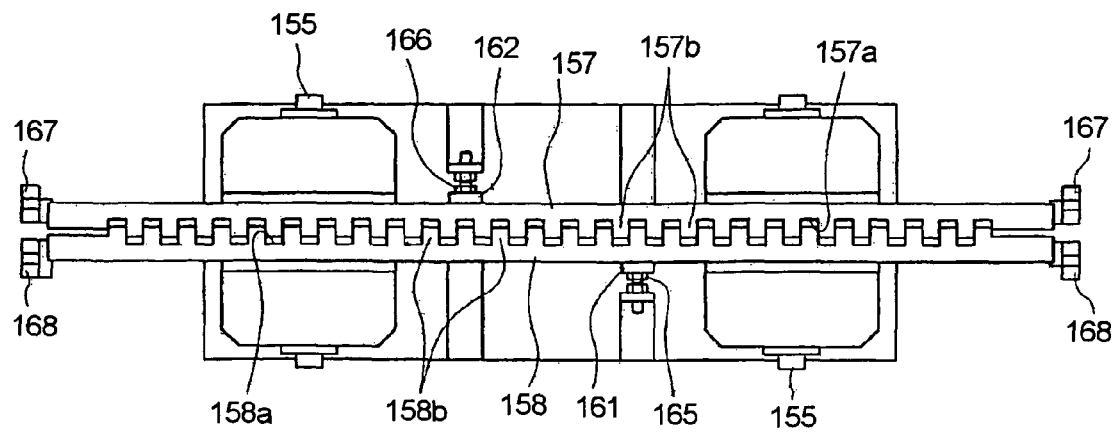
FIG. 19 is a bottom view of a part of the rubber sheet jointing device as viewed in the direction D in FIG. 15.
Figure 20:
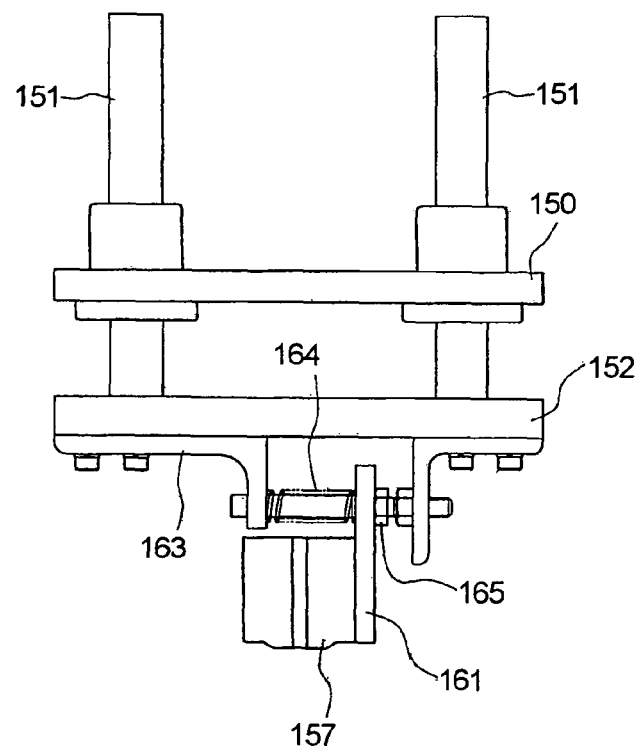
FIG. 20 is a sectional view of the rubber sheet jointing device taken along the line E-E in FIG. 15.

As shown in FIGS. 19 and 20, the horizontally movable members 157, 158 respectively protrude contact pieces 161, 162 toward the vertically movable member 152 and are each urged by the resilient force of a compression spring 164 arranged between itself and a bracket 163 secured to the vertically movable member 152, to come into contact with a stop 165 or 166 associated therewith. Usually, the horizontally movable members 157, 158 are held at respective positions where the contract pieces 161, 162 are kept in abutment with the stops 165, 166, respectively. Thus, the movable members 157, 158 are prevented from relatively moving in a direction to go away from each other beyond the stops 165, 166, but are allowed to relatively move in the other direction to come close to each other (in the direction against the resilient force of the compression springs 163).

Engaging blocks 167, 168 are attached to the opposite ends in the lengthwise direction of the horizontally movable members 157, 158 and have formed thereon engaging grooves 167a, 168a (refer to FIG. 21) opening downward, respectively. The engaging grooves 167a, 168a of the engaging blocks 167, 168 are brought by the downward advance movement of the vertically movable member 152 into engagement with the engaging pins 147, 148 protruding from the pair of jointing segments 145, 146, respectively. The respective horizontally movable members 157, 158 are synchronously moved to come close to each other when the contraction in the drum diameter of the shaping drum 117 causes the pair of jointing segments 145, 146 to advanced toward each other in the tangential direction of the shaping drum 117 with the engaging grooves 167a, 168a being engaged with the engaging pins 147, 148, respectively.

The foregoing engaging blocks 167, 168 and the engaging pins 147, 148 constitute synchronous moving means recited in the claimed invention, and the synchronous moving means is able to move the holder portions 145a, 145b formed in the jointing segments 145, 146 and the pressuring portions 157b, 158b formed on the horizontally movable members 157, 158 in a synchronous relation with each other. The construction of the synchronous moving means is not limited to that described above. For example, the engaging pins 147, 148 may be provided on the sides of the horizontally movable members 157, 158, whereas the engaging blocks 167, 168 may be provided on the sides of the jointing segments 145, 146.

(Operation)

The operation of the third embodiment as constructed above will be described hereinafter. First of all, description will be made regarding the operation for winding the rubber sheet 115 on the circumferential surface of the shaping drum 117. It is now assumed that prior to the winding operation of the rubber sheet 115, the shaping drum 117 is kept in an expansion state with the pair of the jointing segments 145, 146 being positioned to an angular position where they are placed beneath the axis of the shaping drum 117.

When a rubber sheet 115 having been cut to the predetermined length determined in dependence on the kind, dimension and the like of the tires to be manufactured is placed on the support table 124 of the rubber sheet transfer device 111, the transfer table 123 supporting the support table 124 thereon is transferred by the transfer cylinder actuator (not shown) along the rails 122 toward the right as viewed in FIG. 13, and one end (the winding start end portion) 115a of the rubber sheet 115 is positioned to a position which corresponds to one of the jointing segments 145, 146 positioned beneath the shaping drum 117.

Thereafter, the support table 124 of the rubber sheet transfer device 111 is moved upward by the elevation cylinder actuators 125, and the winding start end portion 115a of the rubber sheet 115 is brought into contact with the circumferential surface (with one of the pair of jointing segments 145, 146) of the shaping drum 117 and is made by cling holding means (not shown) to cling to the circumferential surface of the shaping drum 117. In this state, the transfer table 123 supporting the support table 124 thereon is further transferred toward the right as viewed in FIG. 13, simultaneously with which the shaping drum 117 is rotated by the rubber sheet winding device 112. This causes the rubber sheet 115 to be wound as approximately one turn around the circumferential surface of the shaping drum 117, whereby in the same manner as is done with the winding start end portion 115a, the winding terminal end portion 115b of the rubber sheet 115 is made by the cling holding means (not shown) to cling to the circumferential surface (to the other of the pair of jointing segments 145, 146) of the shaping drum 117.

In this way, the seams being respectively the winding start end portion 115a and the winding terminal end portion 115b of the rubber sheet 115 are placed on the circumferential surface of the shaping drum 117, that is, between the jointing segments 145, 146 to face each other with a slight clearance therebetween in the circumferential or tangential direction of the shaping drum 117. Then, the shaping drum 117 is rotated by the rubber sheet winding device 112 through about 180 degrees to position the seams of the rubber sheet 115 to an upward angular position where the seams face the rubber sheet jointing device 113.

In this state, the vertically movable member 152 of the rubber sheet jointing device 113 is moved down by the pressuring cylinder actuator 153, whereby the engaging grooves 167a, 168a of the engaging blocks 167, 168 attached to the horizontally movable members 157, 158 are brought into engagements respectively with the engaging pins 147, 148 and whereby the pressuring portions 157b, 158b of the horizontally movable members 157, 158 are pressured by the thrust force of the pressuring cylinder actuator 153 respectively upon the circumferential opposite end portions of the rubber sheet 115. Thus, the circumferential opposite end portions of the rubber sheet 115 are pinched from radial inside and outside by the holding portions 145b, 146b of the jointing segments 145, 146 and the pressuring portions 157b, 158b of the horizontally movable members 157, 158. The pinching of the rubber sheet 115 by the jointing segments 145, 146 and the horizontally movable members 157, 158 is kept by a later follow motion of the pressuring cylinder actuator 153 while the drum diameter of the shaping drum 117 is decreased.

Subsequently, the adjuster shaft 140 of the shaping drum 117 is rotated by the rotation drive means (not shown). Upon rotation of the adjuster shaft 40, the ball screw shaft 141 is rotated to axially move the drum diameter altering member 136 toward the right as viewed in FIG. 17 through the nut 142 and the connection plate 143. Thus, by the cam action of the cam members 137a, 137b, the plurality of circumferentially arranged segments 133 including the jointing segments 145, 146 are moved radially inward along the guide members 135a, 135b to decrease the drum diameter of the shaping drum 117.

With the decrease in the drum diameter of the shaping drum 117, the pair of jointing segments 145, 146 which correspond to the seams at the circumferential end portions of the rubber sheet 115 are moved inward in the radial direction as they are moved in the tangential direction (in the circumferential direction) of the shaping drum 117 perpendicular thereto. This causes the engaging pins 147, 148 protruding from the pair of jointing segments 145, 146 to decrease the distance (L2) (refer to FIG. 21) in the tangential direction with the decrease in the drum diameter of the shaping drum 117. Thus, the pair of horizontally movable members 157, 158 which engage the engaging pins 147, 148 through the engaging blocks 167, 168 are also relatively moved to come close to each other synchronously with the movements in the tangential direction (the circumferential direction) of the jointing segments 145, 146.

Since in this way, the holder portions 145b, 146b of the jointing segments 145, 146 and the pressuring portions 157b, 158b of the horizontally movable members 157, 158 which cooperate to pinch the circumferential opposite end portions of the rubber sheet 115 are moved to come close to each other with the decrease in the drum diameter of the shaping drum 117, the circumferential opposite end portions (the winding start end portion 115a and the winding terminal end portion 115b) of the rubber sheet 115 are caused to come close to each other and finally, are strongly pressured on each other at their end surfaces to be butt-jointed.

At this time, since the jointing segments 145, 146 having the holder portions 145b, 146b formed thereon and the horizontally movable members 157, 158 having the pressuring portions 157b, 158b formed thereon which cooperate to pinch the rubber sheet 115 are overlapped at their rugged portions 145a, 146a, 157a, 158a of the comb tooth shape, the circumferential opposite end surfaces of the rubber sheet 115 can be pressure-jointed through the predetermined pressuring allowance while the circumferential opposite end portions of the rubber sheet 115 are fully pinched over the entire parts thereof. The wave claws 145c 146c, 157c, 158c formed on the holder portions 145b, 146b and the pressuring portions 157b, 158b prevent the rubber sheet 115 from slipping during the jointing operation.

As a consequence, even when the circumferential opposite end portions of the rubber sheet 115 are pressure-jointed with a strong pressuring force, the pressure-jointed portion does not have any bulge thereon and can be improved in flatness. Further, since any bulge does not occur, it becomes unnecessary to roll or level any bulged portion which would otherwise occur, with the rubber sheet 115 being heated as is done in the prior art, and therefore, the rubber sheet 115 can be kept uniform in quality without being degenerated by the heat.

Upon completion of the step of jointing the circumferential opposite end portions of the rubber sheet 115 in this manner, the circumferential surface of the rubber sheet 115 now taking a round form is held by a vacuum pad (not shown) as described in, e.g., Japanese Published, Unexamined Patent Application No. 2001-138404, in which state the vacuum pad is then moved axially of the shaping drum 117 to remove the round rubber sheet 115 from the circumferential surface of the shaping drum 117. Thereafter, the round rubber sheet 115 removed from the circumferential surface of the shaping drum 117 is transferred to a tire assembling station (not shown) next to the manufacturing apparatus 110.

In the foregoing third embodiment, by the contraction in the drum diameter of the shaping drum 117, the pair of jointing segments 145, 146 with the holder portions 145b, 146b formed thereon are moved radially of the shaping drum 117 as they are moved in the tangential direction of the shaping drum 117, and the circumferential opposite end portions of the rubber sheet 115 are pressure jointed by the utilization of the relative movement of the holder portions 145b, 146b in the tangential direction. However, where it is desired that the relative movement between the holder portions 145b, 146b in the tangential direction of the shaping drum 117 be much longer, there may be employed individual relative moving means which are provided for effecting the relative movement between the holder portions 145b, 146b independently of the jointing segments 145, 146.

As described above, in the aforementioned third embodiment, the meshing portions which are able overlap to mesh with each other are formed on the holder portions 145b, 146b which are movable radially of the shaping drum 117, as well as on the pressuring portions 157b, 158b which are provided on the vertically movable member 152 to be relatively movable in the tangential direction of the shaping drum 117 for pressuring the circumferential opposite end portions of the rubber sheet 115 respectively on the holder portions 145b, 146b. Further, the synchronous moving means 167, 168, 147, 148 is provided for relatively moving the holder portions 145b, 146b and the pressuring portions 157b, 158b in the synchronous relation in the tangential direction of the shaping drum 117. Thus, relative movements in the synchronous relation are performed between the holder portions 145b, 146b as well as between the pressuring portions 157b, 158b with all the parts of the circumferential opposite end portions of the rubber sheet 115 being pinched by the holder portions 145b, 146b and the pressuring portions 157b, 158b. Accordingly, it can be realized to obtain the rubber sheet jointing apparatus which is capable of jointing the circumferential opposite end portions of the rubber sheet 115 easily and reliably without having any bulge at the jointed portion.

Also in the aforementioned third embodiment, since each of the holder portions 145b, 146b and the pressuring portions 157b, 158b has the wave claws 145c, 146c, 157c, 158c which are formed at the contact surface with the rubber sheet 115 for biting the rubber sheet 115, it is possible to securely joint the circumferential opposite end portions with a strong pressuring force.

Also in the aforementioned third embodiment, the synchronous moving means is composed of the engaging pins 147, 148 respectively provided on the holder portions 145b, 146b and the engaging members 167, 168 respectively provided on the pressuring portions 157b, 158b and engageable by the advance movement of the vertically movable member 152 respectively with the engaging pins 147, 148. Thus, by the advance or retraction movement of the vertically movable member 152, the engaging members 167, 168 are brought into engagements with the engaging pins 147, 148, so that the synchronous moving means can be simplified in construction.

Further, in the aforementioned third embodiment, the circumferential opposite end portions of the rubber sheet 115 are pinched between the holder portions 145b, 146b which are provided on the shaping drum 117 to mesh with each other in the partly overlapping state and the pressuring portions 157b, 158b which are provided on the vertically movable member 152 to mesh with each other in the partly overlapping state, and with the circumferential opposite end portions being pinched, the relative movement in the tangential direction of the shaping drum 117 is performed between the holder portions 145b, 146b as well as between the pressuring portions 157b, 158b, whereby the circumferential opposite end portions of the rubber sheet 115 are butt-jointed with each other. Thus, it can be realized to pressure-joint the circumferential opposite end portions of the rubber sheet 115 with each other with the circumferential opposite end portions being fully held over the entire parts thereof. Therefore, even when the circumferential opposite end portions are jointed with a strong pressuring force, the jointed portion can be prevented from having any bulge thereat. Since this advantageously makes unnecessary any smoothening step which would otherwise be required for rolling or leveling any such bulge after the jointing of the rubber sheet 115, it becomes possible to easily obtain the rubber sheet jointing method capable of efficiently manufacturing the rubber sheet 115 which is uniform in thickness, excellent in flatness and also uniform in quality.

The specific constructions of the rubber sheet jointing device 113 and the shaping drum 117 described in the foregoing third embodiment are only to show an example suitable to implementing the present invention. Of course, the present invention is not limited to the constructions as described above and may take any of various forms without departing from the gist of the present invention.

Fourth Embodiment

FIGS. 22 through 26 show the fourth embodiment according to the present invention, which is designed to manufacture an endless band by butt-jointing a forward end portion of the rubber sheet batch S, which is manufactured as described in the foregoing first embodiment to have the predetermined length corresponding to one tire, with a rear end portion of the rubber sheet batch S.

Figure 22:
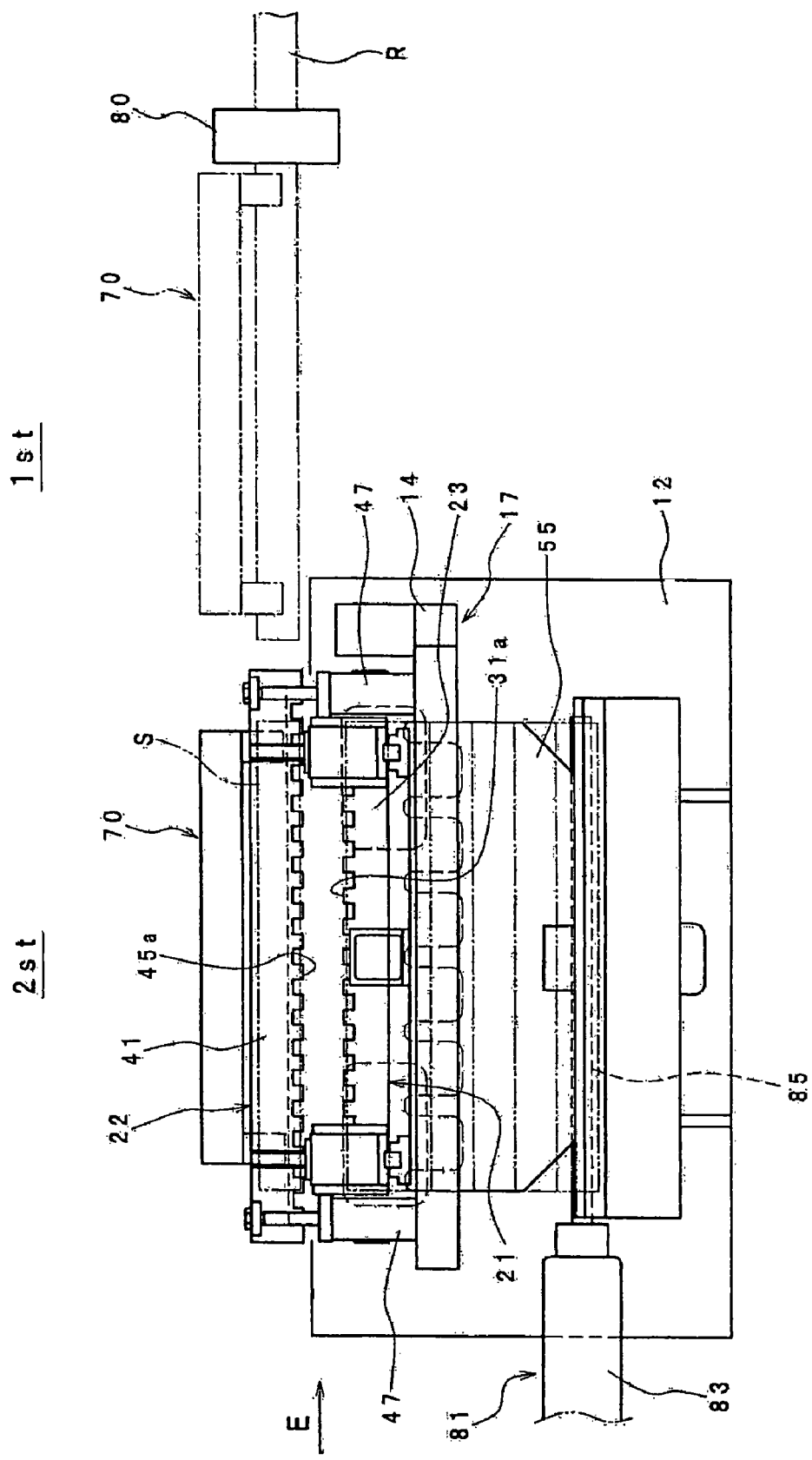
FIG. 22 is a plan view of a rubber sheet jointing apparatus in a fourth embodiment according to the present invention.
Figure 23:
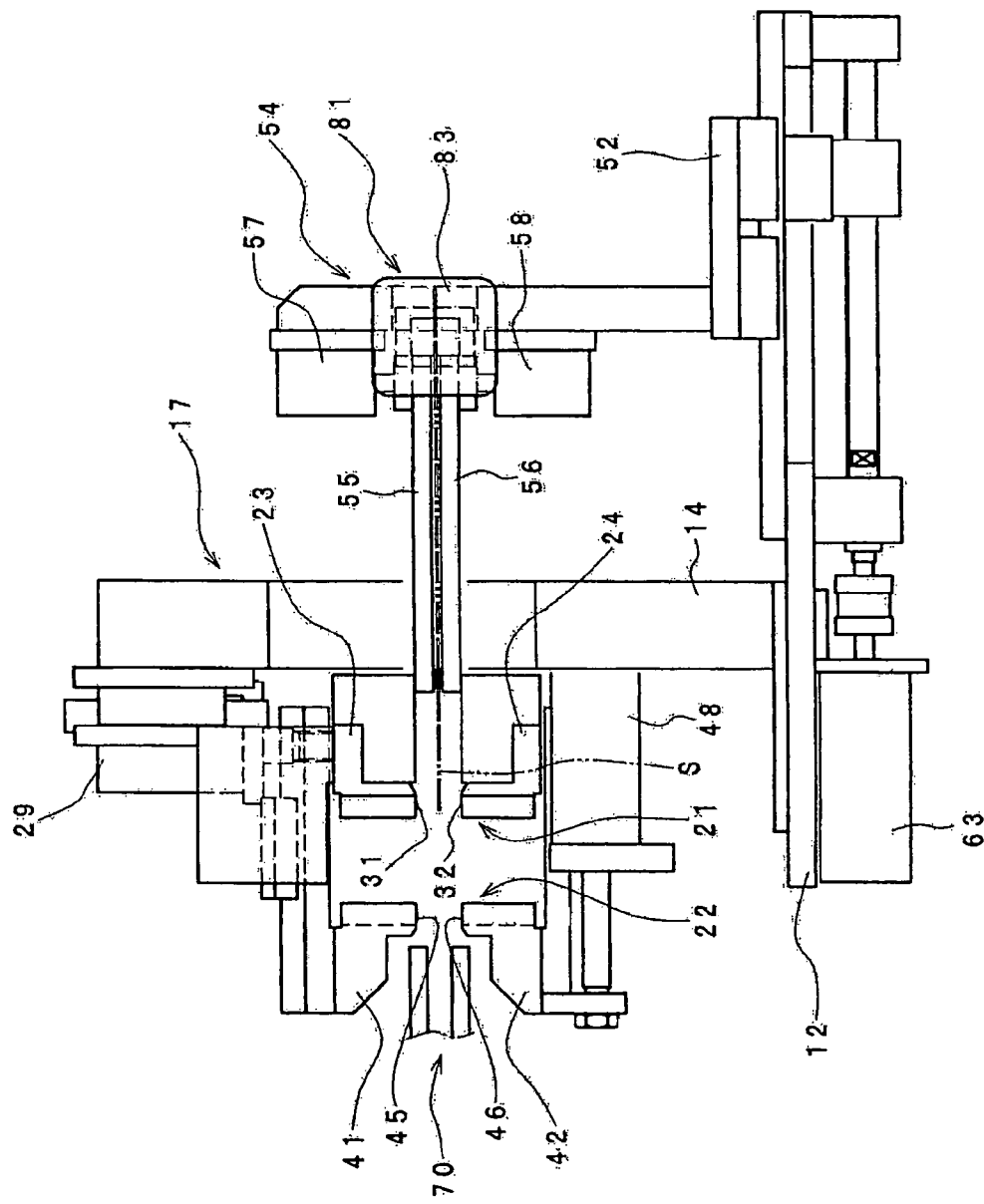
FIG. 23 is an enlarged side view of the apparatus as viewed in the direction E in FIG. 22.

The fourth embodiment is further provided with a rubber sheet batch turning-up means 81 for turning up the rubber sheet batch S to a position which enables the second holding means 22 to hold the forward end portion of the rubber sheet batch S in such a way that the rubber sheet batch turning-up means 81 grips the forward end of the rubber sheet batch S which is sent out by the predetermined amount from between the third holders 55, 56 of the feeding means 54 and then moves the forward end portion of the rubber sheet batch S step by step along a loop locus. The fourth embodiment differs from the foregoing first embodiment in the respect that it is provided with the rubber sheet batch turning-up means 81. The fourth embodiment and the foregoing first embodiment take the same construction and perform the same operation in manufacturing the rubber sheet batch S of the predetermined length corresponding to one tire. Therefore, also with reference to some figures for the first embodiment, the following description will be addressed mainly to the differences from the first embodiment. In FIGS. 22 and 23, components identical to those in the first embodiment are given the same reference numerals as used in the first embodiment, and the description of the identical components will be omitted for the sake of brevity.

In the fourth embodiment wherein the endless band is manufactured, it is necessary to take the manufactured band away from the rubber sheet jointing apparatus 10 described in the foregoing first embodiment. Therefore, in the fourth embodiment, one of the pair of support pillars 13, 14 (i.e., the support pillar 13) upstanding in the rubber sheet jointing apparatus 10 as shown in FIG. 3 is removed, and the rubber sheet jointing apparatus 10 is supported by the other support pillar 14 only in a cantilever fashion (refer to FIG. 22), in which respect the fourth embodiment is also different from the first embodiment.

Figure 24:
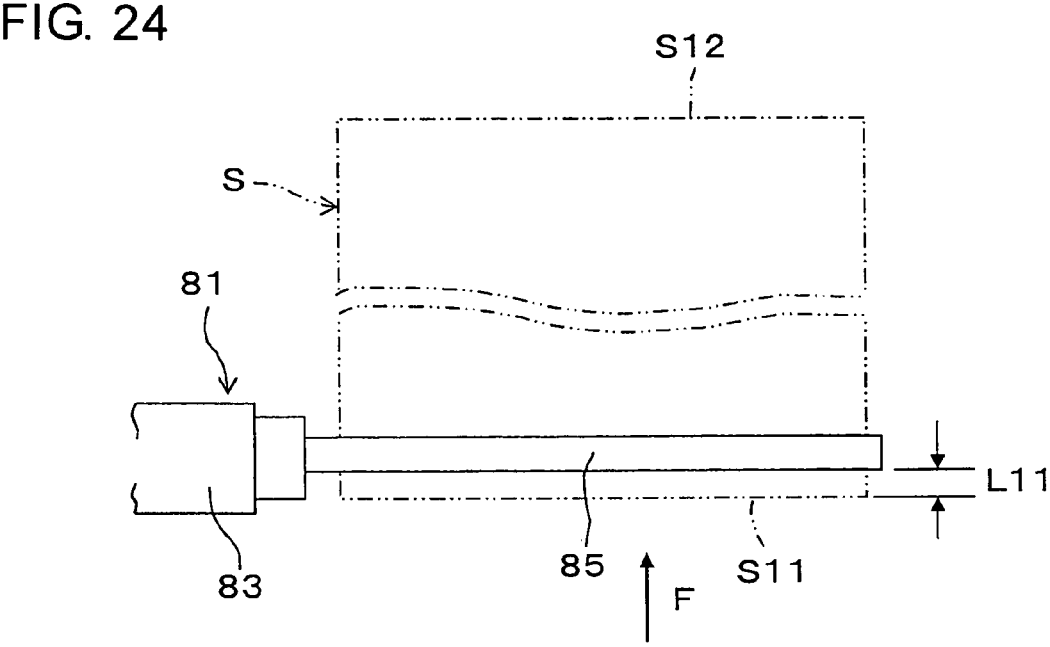
FIG. 24 is a plan view showing hands of a robot in the fourth embodiment according to the present invention.
Figure 25:
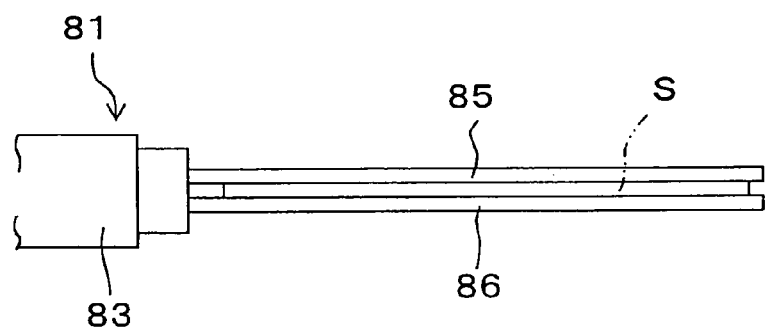
FIG. 25 is a rear view of the robot hands as viewed in the direction F in FIG. 24.

Hereafter, the fourth embodiment will be described with reference to FIGS. 22 through 26 taking an example wherein a material handling robot is utilized as the rubber sheet batch turning-up means 81. The robot has a robot arm 83, which is provided with a pair of hands 85 and 86 operable to open and close, as shown in FIG. 25. These hands 85, 86 are operable to grip the forward end portion of the rubber sheet batch S which is sent out from the pair of third holders 55, 56. At this time, as shown in FIG. 24, the hands 85, 86 grip a portion of the rubber sheet batch S retracted from the end face S11 of the forward end portion for handover or delivery between themselves and the second holders 41, 42.

The robot arm 83 has the freedom of at least three axes in movement, wherein it is movable in the left-right direction (Y-axis direction) and the vertical direction (Z-axis direction) as viewed in FIG. 23 and is rotatable about a θ-axis perpendicular to the Y and Z-axes. Thus, with simultaneous controls of the robot arm 83 along the three axes, the forward end portion of the rubber sheet batch S gripped by the hands 85, 86 is turned up to a position to face the rear end portion of the rubber sheet batch S while being controllably moved along the loop locus LL shown in FIG. 26 step by step, each step corresponding to the width dimension LA of the rubber sheet strip shown in FIG. 10.

Further, in the fourth embodiment, as described in the foregoing first embodiment, the rubber sheet strips S are successively supplied by the supply means 70 to the butt joint station 2*st* and are jointed one after another to manufacture the rubber sheet batch S. When the forward end portion of the rubber sheet batch S (i.e., the first rubber sheet strip) is protruded by a predetermined amount from the third holders 55, 56, the hands 85, 86 of the robot arm 83 grip the forward end portion of the rubber sheet batch S, as shown in FIGS. 22 and 24. With the gripping state being kept, the robot arm 83 under the simultaneous controls of the three axes is controllably moved along the loop locus LL shown in FIG. 26 by the step or distance corresponding to the width dimension LA of each rubber sheet strip in turn in the direction of the arrow indicated in FIG. 26 each time the rubber sheet batch S is sent out by the predetermined distance upon completion of the jointing of each rubber sheet strip.

Figure 26:
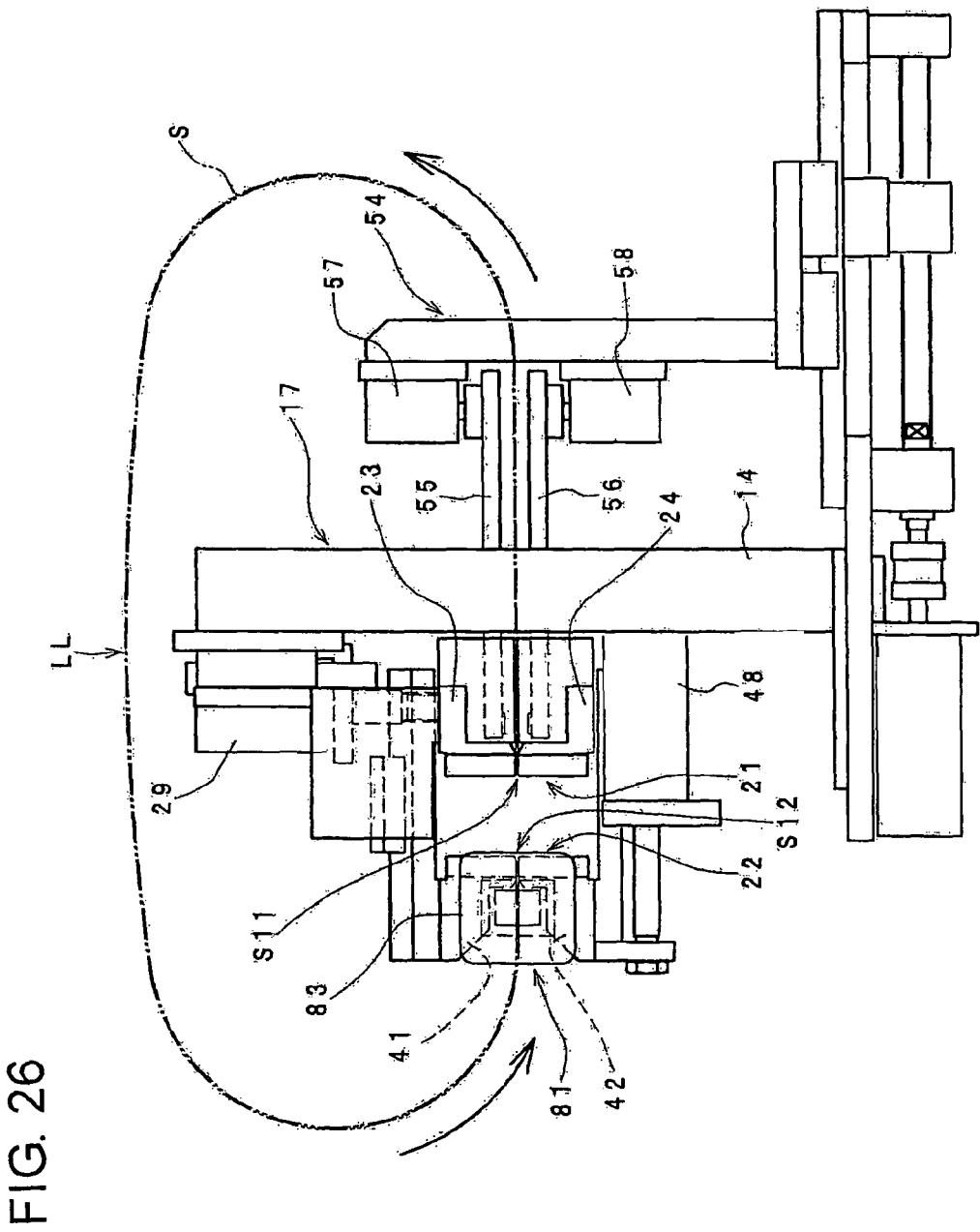
FIG. 26 is a side view similar to that shown in FIG. 23 with the apparatus being in a different state of operation.

When the rubber sheet batch S of the predetermined length corresponding to one tire is manufactured in this way, the robot arm 83 reaches the position shown in FIG. 26, whereby the forward end portion of the rubber sheet batch S gripped by the hands 85, 86 of the robot arm 83 is positioned to a position where it can be held by the second holding means 22. That is, as shown in FIG. 4, the end surface S11 of the forward end portion of the rubber sheet batch S comes to take the position which is between the second holders 41 and 42 and which is retracted by the slight amount L1 from the end surfaces of the rugged portions 45*a*, 46*a* of the comb tooth shape.

In this state, in the same manner as described in the first embodiment, each pair of the first holders 23, 24 and the second holders 41, 42 are vertically moved by the operations of the first cylinder actuators 29, 30 to come close to each other, whereby the rear end portion of the rubber sheet batch S being held by the third holders 55, 56 is held by the first holders 23, 24 while the forward end portion of the rubber sheet batch S being held by the hands 85, 86 of the robot arm 83 is held by the second holders 41, 42. Therefore, as indicated by the two-dot-chain line in FIG. 4, the rubber sheet batch S has its rear end surface held by the holder portions 31, 32 at the position retracted by the distance L1 from the end surfaces of the rugged portions 31*a*, 32*a* of the comb tooth shape and also has its forward end surface held by the holder portions 45, 46 at the position retracted by the distance L1 from the end surfaces of the rugged portions 45*a*, 46*a* of the comb tooth shape.

Then, the second holders 41, 42 are moved by the operations of the second cylinder actuators 47, 48 toward the first holders 23, 24, and the end surface S11 of the forward end portion of the rubber sheet batch S (i.e., the first rubber sheet strip) being held by the second holders 41, 42 is pressured on the end surface S12 of the rear end portion of the rubber sheet batch S (i.e., the last jointed rubber sheet strip) being held by the first holders 23, 24 as the comb tooth shape rugged portions 45*a*, 46*a* formed on the second holders 41, 42 are complementarily meshed with the comb tooth shape rugged portions 31*a*, 32*a* formed on the first holders 23, 24, whereby the endless band is manufactured with the first rubber sheet strip and the last jointed rubber sheet strip being jointed with each other.

The endless band manufactured in this way is taken out by a band taking-out means (not shown) in the X-axis direction (the left-right direction as viewed in FIG. 22) to be carried out of the rubber sheet jointing apparatus 10 and is transferred to a tire assembling step or apparatus (not shown).

According to the foregoing fourth embodiment, by the use of the rubber sheet jointing apparatus 10 similar to that described in the first embodiment, it can be realized to manufacture the rubber sheet batch S of the predetermined length from the plurality of rubber sheet strips S and to continuously manufacture the endless band from the rubber sheet batch S. Accordingly, it can be realized to manufacture the endless bands suitable for use in tires efficiently by the use of the space-saving equipment or facilities.

In particular, where the fourth embodiment is practiced, it becomes unnecessary to provide the rubber sheet jointing apparatus 110 as used in the third embodiment for jointing the opposite ends of the rubber sheet 115 (i.e., the rubber sheet batch S in the fourth embodiment). Therefore, a tire production system including the rubber sheet jointing apparatus 10, the tire assembling apparatus and the like can be simplified in construction and reduced in scale, so that substantial achievements can be realized not only in reducing the cost for manufacturing the tire production system, but also in enhancing the tire productivity as a result of the cycle time for tire production being shortened.

Although the fourth embodiment has been described taking the example wherein the robot is utilized in turning up the forward end portion of the rubber sheet batch S to the position to face the rear end portion of the rubber sheet batch S, the present invention is not necessarily limited to utilizing the robot. For example, the fourth embodiment may be modified to take a construction wherein gripper means for gripping the forward end portion of the rubber sheet batch S is provided on a movable member which is movably guided along a loop guide member and wherein the movable member is moved along the guide member to controllably move the forward end portion of the rubber sheet batch S along the loop locus.

Although the fourth embodiment has been described taking the example wherein tire body plies are manufactured, it may be applied to the manufacturing of the belts of automotive tires with steel cords embedded therein as practiced in the foregoing second embodiment.

Obviously, numerous further modifications and variations of the present invention are possible in light of the above teachings. It is therefore to be understood that within the scope of the appended claims, the present invention may be practiced otherwise than as specifically described herein.

What is claimed is:

1. A rubber sheet jointing apparatus for jointing end surfaces of two rubber sheets by butt joint, the apparatus comprising:

first holding means for releasably holding a joint end portion of one of the two rubber sheets;

second holding means provided movably relative to the first holding means for releasably holding a joint end portion of another of the two rubber sheets; and operating means for pressure-contacting the end surfaces of the two rubber sheets respectively held by the first and second holding means by effecting relative movement between the first and second holding means such that one of the first and second holding means moves toward the other of the first and second holding means in a first direction;

wherein mutually facing surfaces of the first and second holding means are respectively provided with holder portions which are able to partly overlap to mesh with each other, wherein the holder portions provided on the mutually facing surfaces of the first and second holding means are formed as rugged portions each taking a comb tooth shape of rectangular protrusions and rectangular slots to joint the end surfaces of the two joint end portions of the two rubber sheets by allowing the holder portions to overlap with each other through complementary meshing of the rectangular protrusions with the rectangular slots, first and second walls of the rectangular slots being arranged parallel to the first direction, the first and second walls facing each other, wherein the holder portions respectively hold the two joint end portions with the end surfaces of the two joint end portions placed at respective positions which are recessed by an amount (L1) from end surfaces of the rugged portions each taking the comb tooth shape of rectangular protrusions and rectangular slots, said end surfaces of the rugged portions being surfaces of the rectangular protrusions of one holder portion facing, in the first direction, another holder portion, wherein the relative movement between the first and second holding mears is linear, and wherein the rubber sheet comprises an elongated rubber sheet strip of a predetermined length in which an end surface to be jointed extends in a lengthwise direction of the elongated rubber sheet strip;

the apparatus further including supply means for supplying the elongated rubber sheet strip of the predetermined length, in the form of a ribbon, prior to jointing the end surfaces of the two joint end portions, and for feeding the elongated rubber sheet strip directly to the first holding means in a direction perpendicular to the first direction.

2. The rubber sheet jointing apparatus as set forth in claim 1, wherein wave claws are formed on surfaces of the holder portions which contact with the rubber sheets, to bite the rubber sheets for preventing the same from retracting relative to the holder portions.

3. The rubber sheet jointing apparatus as set forth in claim 1, wherein a relative moving amount given by the operating means between the first and second holding means is set to give a predetermined pressuring allowance between the two rubber sheets being respectively held by the first and second holding means.

4. The rubber sheet jointing apparatus as set forth in claim 1, wherein the holder portions respectively hold the two joint end portions with the end surfaces of the two joint end portions placed at respective positions which are retracted by an amount (L1) from end surfaces of the rugged portions each taking the comb tooth shape of rectangular protrusions and rectangular slots.

5. A rubber sheet jointing apparatus for jointing end surfaces of two rubber sheets by butt joint, the apparatus comprising:

a pair of first holders that releasably holds a joint end portion of one of the two rubber sheets;

a pair of second holders that is movable relative to the first holders and that releasably holds a joint end portion of another of the two rubber sheets; and a first operating unit that causes the end surfaces of the two rubber sheets being respectively held by the first and second holders to abut against each other by causing relative movement between the first holders and the second holders such that one of the first and second holders moves toward the other of the first and second holders in a first direction;

a pair of third holders that hold the rubber sheet delivered to and from the first holders; and a second operating unit that feeds the third holders by a predetermined amount whenever operated so that the joint end surface of the rubber sheet delivered between the first holders and the third holders is positioned to a predetermined position with respect to the first holders;

wherein mutually facing surfaces of the first and second holders are respectively provided with holder portions which move to partly overlap to mesh with each other, wherein the holder portions provided on the mutually facing surfaces of the first and second holders are formed as rugged portions each taking a comb tooth shape of rectangular protrusions and rectangular slots to joint the end surfaces of the two joint end portions of the two rubber sheets by allowing the holder portions to overlap with each other through complementary meshing of the rectangular protrusions with the rectangular slots, first and second walls of the rectangular slots being arranged parallel to the first direction, the first and second walls facing each other, wherein the holder portions respectively hold the two joint end portions with the end surfaces of the two joint end portions placed at respective positions which are recessed by an amount (L1) from end surfaces of the rugged portions each taking the comb tooth shape of rectangular protrusions and rectangular slots, said end surfaces of the rugged portions being surfaces of the rectangular protrusions of one holder portion facing, in the first direction, another holder portion, wherein the relative movement between the first and second holders is linear, and wherein the rubber sheet comprises an elongated rubber sheet strip of a predetermined length in which an end surface to be jointed extends in a lengthwise direction of the elongated rubber sheet strip;

the apparatus further including supply means for supplying the elongated rubber sheet strip of the predetermined length, in the form of a ribbon, prior to jointing the end surfaces of the two joint end portions, and for feeding the elongated rubber sheet strip directly to the first holders in a direction perpendicular to the first direction.

6. A rubber sheet jointing apparatus for jointing end surfaces of two rubber sheets by butt joint, the apparatus comprising:

a first holding unit to releasably hold a joint end portion of one of the two rubber sheets;

a second holding unit that is movable relative to the first holding unit and configured to releasably hold a joint end portion of the other of the two rubber sheets; and a first operating unit to move the second holding unit relative to the first holding unit to cause abutment of the end surfaces of the two rubber sheets respectively held by the first and second holding units such that one of the first and second holding units moves toward another of the first and second holding units in a first direction;

a third holding unit to hold the rubber sheet delivered to and from the first holding unit; and a second operating unit to linearly feed the third holding unit by a predetermined amount whenever operated so that the joint end surface of the rubber sheet delivered between the first holding unit and the third holding unit is positioned to a predetermined position with respect to the first holding unit;

wherein mutually facing surfaces of the first and second holding unit are respectively provided with holder portions on which rugged portions each taking a comb tooth shape of rectangular protrusions and rectangular slots are formed to overlap with each other through complementary meshing of the rectangular protrusions with the rectangular slots, first and second walls of the rectangular slots being arranged parallel to the first direction, the first and second walls facing each other;

wherein the first operating unit is set to move the second holding unit relative to the first holding unit through a relative moving amount, which, at the time of a jointing operation, gives a predetermined pressuring allowance between the end surfaces of the two rubber sheets respectively held by the first holding unit and the second holding unit, wherein the holder portions respectively hold the two joint end portions with the end surfaces of the two joint end portions placed at respective positions which are offset recessed by an amount (L1) from end surfaces of the rugged portions each taking the comb tooth shape of rectangular protrusions and rectangular slots, said end surfaces of the rugged portions being surfaces of the rectangular protrusions of one holder portion facing, in the first direction, another holder portion, wherein the relative movement between the first and second holding units is linear, and wherein the rubber sheet comprises an elongated rubber sheet strip of a predetermined length in which an end surface to be jointed extends in a lengthwise direction of the elongated rubber sheet strip;

the apparatus further including supply means for supplying the elongated rubber sheet strip of the predetermined length, in the form of a ribbon, prior to jointing the end surfaces of the two joint end portions, and for feeding the elongated rubber sheet strip directly to the first holding unit in a direction perpendicular to the first direction.

* * * * *